(12) United States Patent
Yeh et al.

(10) Patent No.: US 7,051,038 B1
(45) Date of Patent: May 23, 2006

(54) METHOD AND SYSTEM FOR A REPORTING INFORMATION SERVICES ARCHITECTURE

(75) Inventors: Adam E. C. Yeh, Bellevue, WA (US); Abhijit Kundu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 10/185,139

(22) Filed: Jun. 28, 2002

(51) Int. Cl.
G06F 7/00 (2006.01)

(52) U.S. Cl. .................................................. 707/102

(58) Field of Classification Search ................ 707/200, 707/103 R, 100, 101, 102, 202; 705/1; 709/224, 709/217; 700/236
See application file for complete search history.

(56) References Cited

U.S. PATENT DOCUMENTS

| | | | |
|---|---|---|---|
| 5,317,731 A | 5/1994 | Dias et al. | |
| 5,500,938 A | 3/1996 | Cahill et al. | |
| 5,802,352 A | 9/1998 | Chow et al. | |
| 5,897,634 A | 4/1999 | Attaluri et al. | |
| 5,966,707 A | 10/1999 | Van Huben et al. | |
| 5,978,787 A * | 11/1999 | Wong et al. | 707/2 |
| 6,009,398 A | 12/1999 | Mueller et al. | |
| 6,035,330 A | 3/2000 | Astiz et al. | |
| 6,047,291 A | 4/2000 | Anderson et al. | |
| 6,061,692 A | 5/2000 | Thomas et al. | |
| 6,115,693 A * | 9/2000 | McDonough et al. | 705/10 |
| 6,175,832 B1 | 1/2001 | Luzzi et al. | |
| 6,195,653 B1 | 2/2001 | Bleizeffer et al. | |
| 6,233,583 B1 | 5/2001 | Hoth | |
| 6,233,592 B1 * | 5/2001 | Schnelle et al. | 715/513 |
| 6,236,396 B1 | 5/2001 | Jenson et al. | |
| 6,295,092 B1 | 9/2001 | Hullinger et al. | |
| 6,322,366 B1 | 11/2001 | Bergan et al. | |
| 6,327,594 B1 | 12/2001 | Van Huben et al. | |
| 6,341,286 B1 * | 1/2002 | Kawano | 707/101 |
| 6,421,724 B1 * | 7/2002 | Nickerson et al. | 709/224 |
| 6,658,093 B1 | 12/2003 | Langseth et al. | |
| 6,704,745 B1 * | 3/2004 | Della-Libera et al. | 707/103 R |
| 6,708,172 B1 | 3/2004 | Wong et al. | |
| 6,811,608 B1 | 11/2004 | Stewart et al. | |
| 6,885,734 B1 | 4/2005 | Eberle et al. | |
| 2002/0016814 A1 | 2/2002 | Convent et al. | |
| 2002/0059425 A1 | 5/2002 | Belfiore et al. | |
| 2002/0099692 A1 | 7/2002 | Shah et al. | |
| 2002/0147805 A1 | 10/2002 | Leshem et al. | |
| 2003/0033155 A1 * | 2/2003 | Peerson et al. | 705/1 |
| 2003/0115194 A1 | 6/2003 | Pitts et al. | |
| 2003/0154237 A1 | 8/2003 | Mah et al. | |

(Continued)

OTHER PUBLICATIONS

Reuven M. Lerner, "At the Forge: Introducing SOAP", Mar. 2001, ACM, 6 pages.*

(Continued)

*Primary Examiner*—Paul L. Rodriguez
*Assistant Examiner*—Luke Osborne
(74) *Attorney, Agent, or Firm*—Senniger Powers

(57) ABSTRACT

A system and method for a reporting information service using metadata to communicate with databases and a user interface. The invention includes software in a data access component, a report component, and a user interface component for populating, maintaining, and dispatching reports responsive to user requests for the reports via metadata. The data access component provides a logical view of data in a database via data access metadata. The report component populates, maintains, and dispatches reports via report metadata characterizing the reports. The user interface component renders the report dispatched from the report component via user interface metadata specifying rendering attributes for the report.

46 Claims, 22 Drawing Sheets

U.S. PATENT DOCUMENTS

2003/0156138 A1  8/2003  Vronay et al.
2004/0078252 A1  4/2004  Daughtrey et al.

OTHER PUBLICATIONS

Varlamis et al., "Bridging XML-Schema and Relational Databases: A System for Generating and Manipulating Relational Databases Using Valid XML Documents," Proceedings of the ACM Symposium on Document Engineering, 2001, pp., 1-5-114, ACM Press, New York, U.S.A.

Davulcu et al., "A Layered Architecture for Querying Dynamic Web Content," Proceedings of the 1999 ACM SIGMOD International Conference on Management of Data, 1999, pp. 491-502, ACM Press, New York, U.S.A.

Cariño et al., "StoeHouse Metanoia—New Applications for Database, Storage & Data Warehousing," Proceedings of the 2001 ACM SIGMOD International Conference on Management of Data, 2001, pp. 521-531, ACM Press, New York, U.S.A.

Fernandez, "Efficient Evaluation of XML Middle-Ware Queries," Proceedings of the 2001 ACM SIGMOD International Conference on Management of Data, 2001, pp. 103-114, ACM Press, New York, U.S.A.

* cited by examiner

FIG. 9

802 — Report

- +ReportId() : int
- +NewReportId() : int
- +UserId() : int
- +GroupId() : int
- +CurrentPageNumber() : int
- +MaxZoomOutLevel() : int
- +CurrentDrillDownLevel() : int
- +PipelineId() : int
- +ReportName() : string
- +ReportDescription() : string
- +ReportType() : string
- +SortExpression() : string
- +FilterExpression() : string
- +LastFilterExpression() : string
- +DrillDownExpression() : string
- +ReportDataFilter() : string
- +ServerName() : string
- +DatabaseName() : string
- +DBUserName() : string
- +DBPassword() : string
- +Provider() : string
- +CubeName() : string
- +DetailsExpression() : string
- +HasTimeSlice() : bool
- +AllowSorting() : bool
- +AllowFiltering() : bool
- +AllowSaving() : bool
- +CacheData() : bool
- +HasCreative() : bool
- +ShowCreative() : bool
- +HasDetails() : bool
- +HasError() : bool
- +ShowRollUp() : bool
- +ShowDrillDown() : bool
- +IsRangeSelection() : bool
- +NeedsSummaryTotal() : bool
- +FilterSaved() : bool
- +EnableCustomization() : bool
- +Dimensions() : ReportDimensionCollection
- +Measures() : ReportMeasureCollection
- +Slices() : ReportSliceCollection
- +Filters() : ReportFilterCollection
- +StartDate() : DateTime
- +EndDate() : DateTime
- +StartMonth() : DateTime
- +EndMonth() : DateTime
- +Error() : Exception
- +ReportData() : DataSet
- +Load()
- +LoadSlices(in ReportId : int, in UserIdForSecurity : int)
- -SetDefaultSliceValue()
- +AddNew(in UpdateUsersDefaultReport : bool)
- +Update(in FullUpdate : bool, in UpdateUsersDefaultReport : bool, in SetToNull : bool)
- +Delete(in ActiveConnection : SqlConnection, in ActiveTransaction : SqlTransaction)
- +Execute()
- -PrepareSQLColumnList(inout Dimension : string, inout TempSlice : string) : string
- -PrepareSliceList(inout SQLSlices : string)

| DataAccess |
|---|
| +DataAccess() |
| +Dispose() |
| -~DataAccess() |
| #Dispose() |
| +CommandString() |
| +ConnectionString() |
| +DefaultConnectionString() |
| +CommandTimeout() |
| +HasError() |
| +Error() |
| +CacheIt() |
| +DataAsTable() |
| +DataAsDataSet() |
| +DBConnection() |
| +DBTransaction() |
| +ExecuteRawSQL() |
| +ExecuteSQLCommand() |
| +ExecuteQueryCommand() |
| +ExecuteNonQueryCommand() |
| +GetDataFromUIMetadata() |
| +GetDataFromUIMetadata2() |
| +GetDataTableFromUIMetadata() |
| +GetDataAsDataSet() |
| +LoadDataFromXMLFile() |
| +LoadReportData() |
| +GetDataFromXML() |
| +OpenConnection() |
| +CloseConnection() |
| +OpenTransaction() |
| +CommitTransaction() |
| +RollBackTransaction() |
| +PopulateCache() |
| +PurgeCacheObject() |
| +RemovedCallback() |
| +GetCacheData() |
| +AddCacheEntryToRegistry() |
| +ReportDataInCache() |
| +RefreshUIMetadataTable() |
| +ProcessSQLRequest() |
| +ProcessSQLRequest() |
| +AddNewRecord() |
| +UpdateRecord() |
| +DeleteRecord() |
| -IsParameterAStringType() |

FIG. 11

```
                                    ┌─ 806
                                    User
─────────────────────────────────────────────────────────────────────
+User()
+UserId() : int
+CreatedByUser() : int
+RoleId() : int
+NoOfRowsPerPage() : int
+ColumnExpansion() : short
+UserName() : string
+Password() : string
+SecretQuestion() : string
+SecretAnswer() : string
+UserEmail() : string
+CountryCode() : string
+DefaultReportId() : int
+IsAdmin() : bool
+IsSuperUser() : bool
+LanguageId() : int
+ReportGroups() : ReportGroupCollection
+Role() : UserRole
+UserSecurity() : SecurityFilters
+HasError() : bool
+Error() : Exception
+IsUserValid(in HashPassword : bool) : bool
+Load(in _UserId : int, in _LoadSecurityOnly : bool)
-InitializeUserProperties(inout oUserData : DataView)
-LoadSecurity()
+AddNew()
+Update(in FullUpdate : bool, in HasPasswordChanged : bool)
+UpdateDefaultReport(in ActiveConnection : SqlConnection, in ActiveTransaction : SqlTransaction)
+Delete()
```

FIG. 12

ApplicationGlobal (1202)

- +DrillDownFilterSeparator : string = " and "
- +FilterValueSeparator : string = ","
- +CreativeLinkMeasureName : string = "CreativeLink"
- +StringDBNullValue : string = "<NULL>"
- +ValueSeparator : string = "|"
- +ValueDelimiter : string = "◊"
- +ItemSeparator : string = "§"
- +HTMLNonBreakingSpace : string = " "
- +SortExpressionSeparator : char = ';'
- +SortItemSeparator : char = ','
- +GridItemSeparator : char = '#'
- +FilterExpressionSeparator : char = '¥'
- +FilterItemSeparator : char = '\'
- +SQLColumnSeparator : char = ','
- +SQLLevelSeparator : char = ';'
- +SQLDimensionSeparator : char = ':'
- +DefaultRowsPerPage : short = 20
- +DefaultLanguageCode : short = 1033
- +MaxNoOfCharacters : short = 35
- +MaxNoOfTabs : short = 5
- +MaxNoOfColumns : short = 10
- +MaxNoOfRowsForExport : int = 25000
- +EmailIdPattern : string = "[A-Za-z0-9_.]+@([A-Za-z0-9_]+\.)+[A-Za-z]+"
- +ValidateSortExpression()
- +ValidateFilterExpression()
- +ValidateDrillDownExpression()
- +Escape()
- +UnEscape()
- +EscapeSpecialCharacters()
- +UnEscapeSpecialCharacters()
- -UnEscapeLikeValues()
- +DecodeFilterExpression()
- +GetUnFormattedFilterExpression()
- +GetCleanFilterExpression()
- +GetColumnDataType()
- +FormatValueForDataType()
- +GetCountryList()
- +GetMetadataTables()
- +GetSQLStringForMetadataTable()
- +GetReportXMLPath()
- +GetWebConfigValue()
- -LoadLoggedInUser()
- +GetLoggedInUserId()
- +GetLoggedInUserLCID()
- +LoadUser()
- +LoadReport()
- +IsColumnAMeasure()
- +ColumnIsVisibleToUser()
- +GetLastActiveDimension()
- +SpellNumber()
- +GetReportDates()
- +GetReportSlice()
- +SetReportDefaultSlice()
- +SwitchTimeSlice()
- -GetSlicePrefix()
- +FormatSliceName()
- +DateDiff()
- +FirstDateIsMoreThanSecond()
- +FileIsValidForImage()
- +ReplaceSortExpLevelNameWithDisplayName()
- +ReplaceFilterExpLevelNameWithDisplayName()
- +UserNameAndPasswordValid()
- +GenerateUniquePassword()
- +ValidateEmailAddress()
- +IsValidEmail()
- +ValidEmailCharacters()
- +SendMail()
- +GetDateInUSEnglishFormat()
- +GetReportDataStatus()
- +GetEmailFromCountryCode()

METHOD AND SYSTEM FOR A REPORTING INFORMATION SERVICES ARCHITECTURE

TECHNICAL FIELD

The present invention relates to the field of reporting information services. In particular, this invention relates to a system and method for a reporting information service using metadata to communicate with databases and a user interface.

BACKGROUND OF THE INVENTION

Data processing in a large-scale, enterprise application often presents usability, manageability, and scalability problems due to the large volume of data. For example, Web sites generate gigabytes of data every day to describe actions made by visitors to the sites. In fact, the average number of hits on a popular network of Web sites can reach 1.5 billion hits per day or more. This data has several dimensions, such as where each visitor came from, the time of day, the route taken through the site, and the like. Moreover, the amount of data continually increases as the number of Web services and the amount of business they conduct increases. Therefore, processing the large amount of data to produce meaningful usage reports and clickstream analysis for a network of sites involves overcoming several challenges.

Some prior art systems facilitate the transfer of data between a requesting computer and data repository over a computer network. However, such systems lack a framework for providing flexible reporting, scalability, fast response times, and intelligent caching. In addition, such systems fail to operate efficiently with the enormous size of current databases. Other prior art systems address database design, storage, and access techniques. However, such prior art systems fail to provide a system for producing combined reports having data accessed from various heterogeneous databases.

For these reasons, a feature-rich and scalable reporting information service is desired to address one or more of these and other disadvantages.

SUMMARY OF THE INVENTION

The invention includes a reporting information service system architecture having several components or services. The software of the invention provides an intelligent reporting information service that serves as an implementation for a reporting platform. In particular, the invention includes software in a data access component, a report component, and a user interface (UI) component for populating, maintaining, and dispatching reports responsive to user requests for the reports via metadata. The data access component provides a logical view of data in a database via data access metadata. In addition, the data access component provides uniform and transparent data access to different physical databases. The report component populates, maintains, and dispatches reports via report metadata characterizing the reports. In addition, the reporting component virtualizes, caches, and manages the reports. The UI component renders the report dispatched from the report component via UI metadata specifying rendering attributes for the report. The UI component provides seamless and consistent presentation for various types of reports. In addition, the invention software provides data virtualization and federation in the reporting component, intelligent caching services, segregation between the UI component and the report component, advanced data management, and a granular security model.

The architecture of the invention is extensible for any future additions and scalability improvements (e.g., security at a more granular level). Flexible configuration of the invention offers improved performance and fail-over redundancy. The reporting service improves performance for the users who access reports from different geographical locations around the world. The reporting component seamlessly integrates with the UI controls to provide an improved programming environment. The invention also provides simplified report management. Further, the invention is operable in a programming environment in which libraries are provided to facilitate the creation of secure applications resulting in ease of deployment of those applications.

In accordance with one aspect of the invention, a system for reporting is implemented on one or more servers. The system includes a data access component, a report component, and a user interface component. The data access component accesses at least one database via data access metadata to provide a logical view of data in the database. The report component populates, maintains, and dispatches at least one report via report metadata. The report is created with data from the database accessed by the data access component. The user interface component renders, via user interface metadata, the report dispatched from the report component.

In accordance with another aspect of the invention, one or more computer-readable media include a metadata schema in a reporting information service system. The metadata schema include at least one data access class, at least one report class, and at least one user interface class. The data access class represents a data access object defining a structure of data within one or more databases. The report class represents a report object defining one or more transactions and one or more communications for populating a report with the data from the databases. The user interface class represents a structure and at least one property of the populated report.

In accordance with yet another aspect of the invention, a method is used in a reporting delivery service system. The method includes receiving a query from a user representing a request for a report and retrieving the report from a repository via metadata and displaying the retrieved report to the user in response to the received query.

In accordance with yet another aspect of the invention, a method populates and maintains at least one report in a repository. The method includes computing a frequency value for a report stored in a repository, comparing the computed frequency value to a threshold value, and adding a report to the repository if the computed frequency value exceeds the threshold value.

In accordance with yet another aspect of the invention, a repository system is responsive to a report dispatch system for populating, maintaining, and delivering one or more reports for presentation to a user via a user interface. The reports include data populated from at least one database via a data access system. The repository system includes a plurality of report subject areas. Each of the report subject areas includes a plurality of report hash keys and each of the report hash keys identifies a plurality of the reports.

Alternatively, the invention may comprise various other methods and apparatuses.

Other features will be in part apparent and in part pointed out hereinafter.

BRIEF DESCRIPTION OF THE DRAWINGS

FIG. 9 is a block diagram of an exemplary object model for a report object.

FIG. 10 is a block diagram of an exemplary object model for a data access object.

FIG. 11 is a block diagram of an exemplary object model for a user object.

FIG. 12 is a block diagram of an exemplary object model for an application global object.

Corresponding reference characters indicate corresponding parts throughout the drawings.

DETAILED DESCRIPTION OF THE INVENTION

Figure 1:
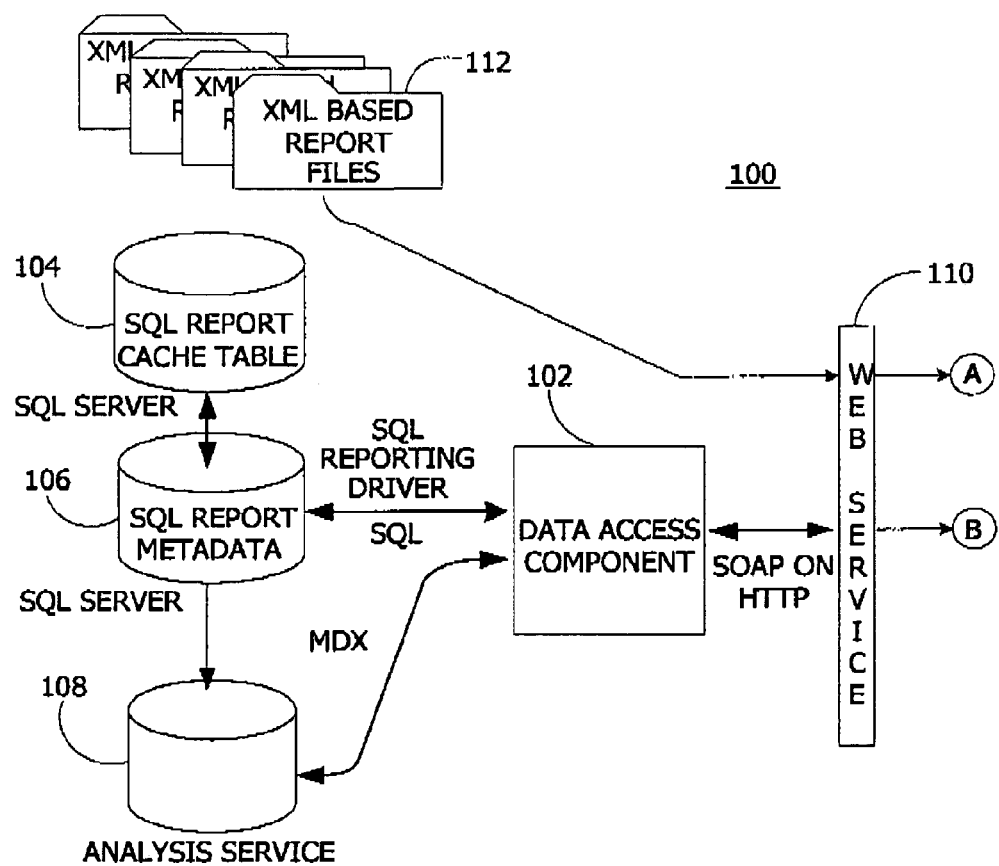
FIG. 1 is a block diagram illustrating exemplary data access components according to the invention.
Figure 2:
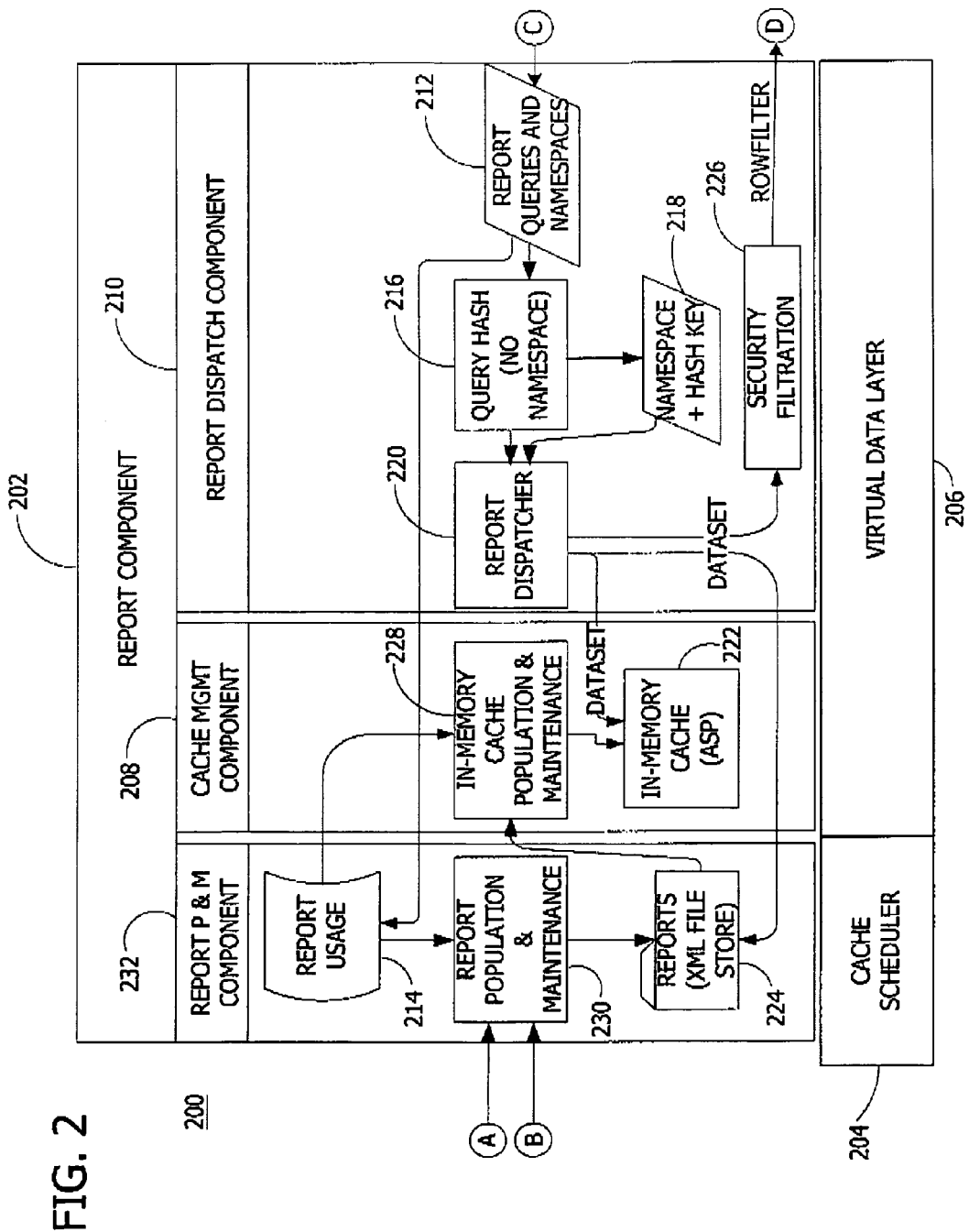
FIG. 2 is a block diagram illustrating an exemplary reporting service according to the invention.
Figure 3:
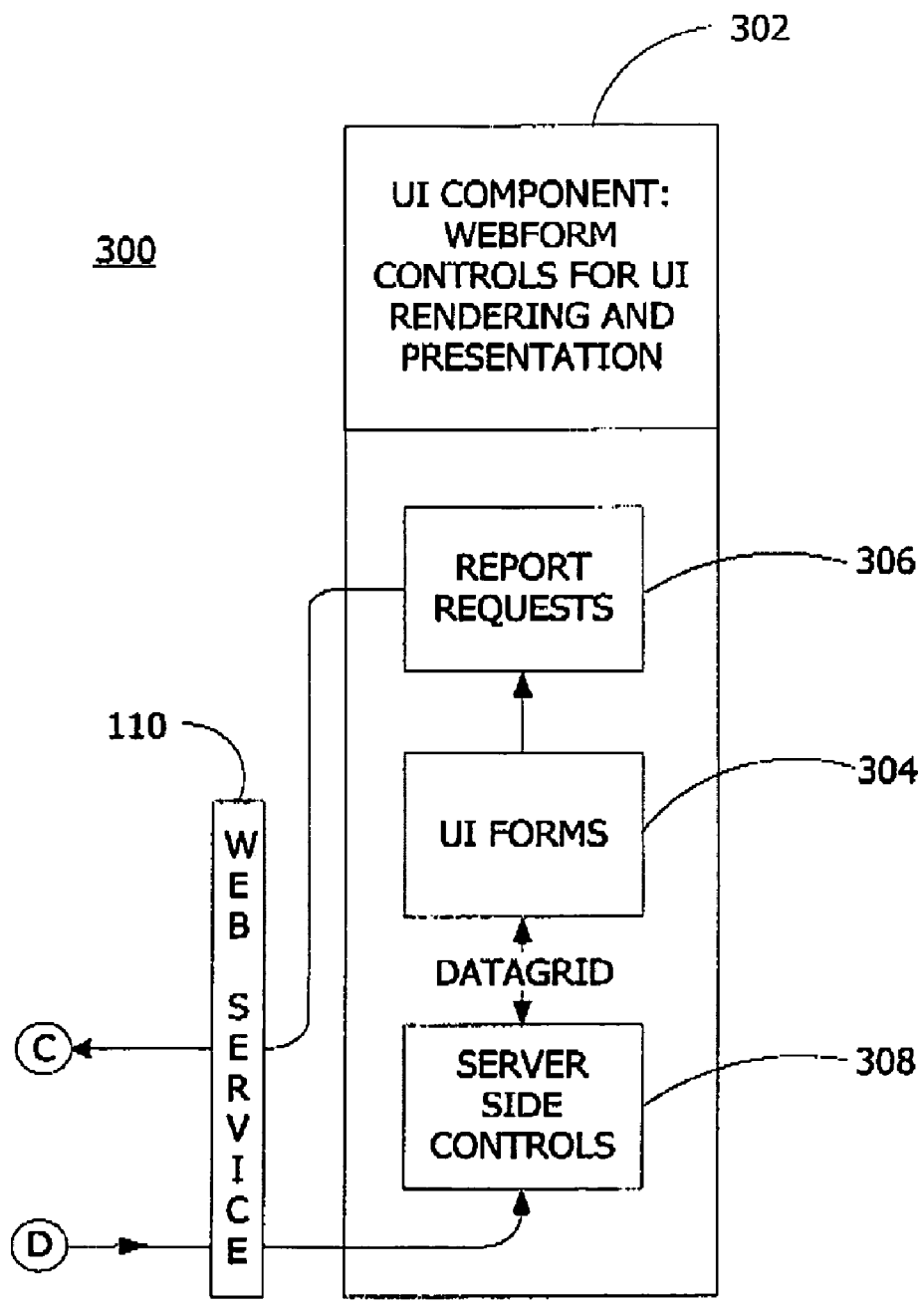
FIG. 3 is a block diagram illustrating exemplary user interface components according to the invention.

The invention provides an architecture for a reporting service system. In particular, FIGS. 1–3 illustrate the architecture of the invention software that can be implemented on one or more servers. In one embodiment, the invention software includes, but is not limited to, three services or components: a data access service 100 (see FIG. 1), a report service 200 (see FIG. 2), and a server-site user interface (UI) service 300 (see FIG. 3), control, or other UI component 302 (e.g., a webform control).

The data access service 100 accesses at least one database via data access metadata to provide a logical view of data in the database. The report service 200 populates, maintains, and dispatches at least one report via report metadata. The report is created with data from the database accessed by the data access service. The UI service 300 renders, via UI metadata, the report dispatched from the report service. In one example, the data access service 100 manages web usage data. In this example, the report service 200 manages one or more reports containing the web usage data managed by the data access service 100. Further, the UI service 300 manages the display of the reports managed by the report service 200.

The software of the invention is based on a loosely coupled and message-based application model. In one embodiment, components are built in the form of web services (e.g., the web services illustrated in FIG. 1 and FIG. 3) and a complete solution is delivered to an end user by aggregating and integrating the web services. The web service implementation enables prescriptive programming models for others (e.g., software developers or the end user) to extend the functionality. For example, the invention software and its services can be developed using building blocks provided by extensible markup language (XML) technologies such as simple object access protocol (SOAP) over hypertext transfer protocol (HTTP). Communication among the components of the invention software and between different tiers can be carried out via SOAP over HTTP in asynchronous fashion (e.g., web services) or communication can be implemented within the same application without the web services. In this alternative embodiment of the invention, the software architecture of the invention does not rely on web services. In such an embodiment, all the components illustrated in FIGS. 1–3 are implemented within the context of a single application program. The reports delivered by the services of the invention are in the form of XML documents that can be rendered using style sheets that apply formatting to the data (e.g., XSLT/Xpath) or the XML documents can be processed by custom-made UI server-side controls. The physical data flow among components is transported with SOAP or an object method in the XML stream.

The services integrate components such as illustrated in FIGS. 1–3: one or more databases or data stores 104, 106, a data access component 102, a cache scheduler 204, a virtual data layer 206, and a report presentation (UI) component 302. In one embodiment, the cache scheduler 204 and the virtual data layer 206 are part of the report component 202. The cache scheduler 204 populates and maintains the reports via a report population and management component 232. The virtual data layer 206 has a cache management component 208 and a dispatch component 210. The cache management component 208 manages the reports stored in a cache. The dispatch component 210 dispatches the reports to the UI component 302. Two additional services, metadata and security services, interact with all the components to ensure the full autonomy and security of the reporting architecture of the invention when implemented for applications.

The framework of the invention segregates the UI component 302 (e.g., report presentation), the report component 202, and the data access component 102 to provide minimal dependency between components. For example, changes in the UI component 302 will not necessitate code changes for the report component 202. Segregated components provide systems that are manageable and extensible. In one embodiment, the interaction between various components illustrated in FIGS. 1–3 is asynchronous so that the calling component is not blocked at any time. The status of a request is communicated to the calling component either by polling or by a callback.

It is contemplated by the inventors that the invention software may include more or less services or components, and that the services and components of the invention software may include more or less functionality than the services, components, and functionality described and illustrated herein and be within the scope of the invention. For example, the data access component 102 may be part of the report component 202 and/or the databases. In addition, those skilled in the art will note that the framework and software of the invention may be implemented with or without various communications protocols, not specifically limited to the web service implementation described herein.

The details regarding each of the service and corresponding components are described in the following sections.

Data Access Service

Referring first to FIG. 1, the software of the invention includes a consistent and unified data access service 100 to provide a unified way of retrieving data from any physical database. Components of the data access service 100 of the invention streamline data retrieval from different kinds of physical databases 104, 106 such as structured query language (SQL), online analytical processing (OLAP), and XML.

The data access service 100 provides transparent data access by accessing data via the data access component 102 from the physical databases 104, 106 and providing a logical view of the data. For example, the data access service 100 may include a SQL reporting driver, an analysis service 108 such as OLAP web services, XML web services 110, and a data access client proxy. The SQL reporting driver provides access to data physically stored in a relational database such as SQL databases 104, 106 and is implemented using stored procedures and parameterized queries. The OLAP web services provide access to data physically stored in OLAP cubes and are implemented using XML for analysis and parameterized multidimensional expression language (MDX) queries by the data access component 102. The XML web services 110 access data physically stored in XML files 112 using Xpath for data retrieval. The data access client proxy translates logical requests into requests to individual physical databases such as SQL databases 104, 106 and is driven by metadata (described below).

For example, the data access component 102 accesses a SQL database 106 storing SQL report metadata. The SQL database 106 storing SQL report metadata accesses another SQL database 104 storing report cache tables to provide input to the analysis service 108. The analysis service 108 communicates with the data access component 102 via MDX queries. The data access service 100 communicates with the report service 200.

Report Service

Referring next to FIG. 2, the software of the invention provides data virtualization and federation in the report service 200 to enable the creation of reports that cross-reference data from different databases in a unified manner. Such federation correlates data from any perspective. In particular, in response to a request for a plurality of reports, the report component 202 retrieves each of the requested reports and unions or otherwise combines the retrieved reports into a combined report. The combined report is then displayed to the user via the UI component 302. The virtual data layer 206 offers a uniform logical view of the reports stored in the databases, cubes and other sources. The software of the invention determines the most efficient way to retrieve report data from the databases, XML files, cache, or a combination of these resources if needed. The system provides services so that users have the ability to cross reference data between Pivot and Standard reports. The virtual data layer 206 also employs a built-in caching mechanism and self-validating function. The exemplary flow illustrated in FIG. 2 for population, maintenance, and dispatching of reports is described below.

Server-Side UI Controls

It is contemplated by the inventors that the user interfaces with the framework of the invention via a UI or any other type of interface. For example, referring next to FIG. 3, server-side UI controls of the UI component 300 are custom-made controls that consume the XML output at 308 from the report service 200. The UI controls are developed to support rendering on different browsers without a need for client side scripting. Exemplary components of the server-side UI controls include, but are not limited to, a data grid, a custom display, a calendar control, a tree-view control, and a composite control. The data grid enables tabular reporting and grid-based navigation with roll-up and drill-down functions (collapse and expansion using data grid), zoom-in and zoom-out functions (sub-tree navigation with hyperlinks), and flat two-dimensional reports without aggregations. The UI forms or custom display includes custom style sheets to render specific presentations with custom events at 304. The custom display complies with the specifications of the data access service 100 components. Rendering and eventing is supported by the targeted browser. The calendar control provides date range and individual date selections. The calendar control includes a localizable calendar selector for different granularity (e.g., day, week, month, year), different time calendars (e.g., fiscal). The tree-view control displays a report list categorized by groups in a tree structure. The tree-view control can expand/collapse on tree nodes and is selectable on the nodes. The composite control includes a collection of server controls aggregated to serve as the single unit of navigation or a part of page. The composite control is used to simplify the handling of dynamic pages and their navigation. The composite control also offers logical grouping of more granular server site controls.

Report requests are received by the UI component 302 from the UI forms at 306 and from user input. The report requests are transmitted to the report service 200 via the web services 110.

Report Service—Report Population and Cache Management Components

Components of the report service 200 illustrated in FIG. 2 are next described. The exemplary report service 200 illustrated in FIG. 2 includes a report population and maintenance component 232, a cache management component 208, and a report dispatch component 210. The software of the invention provides intelligent caching services to improve a hit-ratio on requested reports to improve performance. The caching is intelligent in order to maximize performance with available disk and memory resources. The system intelligently populates and maintains reports in the form of physical XML files as well as in-memory cache based on usage patterns. In one embodiment, report population occurs as a result of a user's request or a pre-scheduled event.

The report population and maintenance component 232 and the cache management component 208 provide services (e.g., web-based) that perform the tasks of populating and managing reports stored as physical files (e.g. XML) and in-memory cache. Exemplary components accessing the physical data via a data access client proxy include, but are not limited to, a report usage repository 214, a report population and maintenance engine 230, an XML file store 224, an XML file registry (see report registry 502 in FIG. 4 and report registry 502 in FIG. 5), and an in-memory cache 222. The report usage repository 214 stores statistics regarding the usage of the reports. Statistics stored include, but are not limited to, frequency of access and last time of access. The report population and maintenance engine 230 intelligently manages the data stored in physical XML files and in-memory cache. Population and maintenance is triggered by events such as when the frequency of accessing a report crosses a threshold level, when source data for a report changes, and when updates occur at a fixed time period (e.g., a daily update). The XML file store 224 stores reports in the form of physical XML files. Each XML file corresponds to a report instance. The store 224 organizes the files into directories where each directory corresponds to a hash key. The namespace partition keys are based on a time dimension slice. All the reports can be requested individually or collectively depending on the time slice. The XML file registry maintains the list of reports contained in the XML files. The registry includes, but is not limited to, the report hash key, the start date of the report, and the active count. The in-memory cache 222 stores reports cached in memory. The report hash key and its time slice constitute the signature of the report cached in memory. The report signature is used to store and retrieve their content from cache. Each memory data block stores the same report content in one report. A report request from a user may include a collection of these memory data blocks.

When first requested, report content is composed on-demand from persistent stores, such as databases or file systems. If the report is composed from a database, the report component provides the content from data in the databases. In many cases, because reports are often read-only and are not updated with historical content, file systems store the reports persistently so the reports can be efficiently retrieved.

Report Population and Maintenance

The report usage repository 214 of the report population and maintenance component 232 is updated with the report queries and namespaces 212 to maintain a frequency of requests for reports. The report usage repository 214 tracks the number of times a particular report is requested per fixed period (e.g., per day), whereas a report registry 502 (see FIG. 4 and FIG. 5) records the number of times a cached report has been requested since a certain date (e.g., Jan. 1, 2000). The report usage repository 214 or other log and the report registry 502 support the full cycle report population workflow. The report usage repository 214 also functions to monitor the global usage of reports to provide information to the cache scheduler 204 to decide what reports to pre-populate when memory on the reporting server becomes available. The report registry 502 tells the report dispatcher 220 whether or not the report is cached in memory or file systems. The report usage repository 214 is accessed by the report population and maintenance engine 230 of the report population and maintenance component 232 to govern the maintenance of reports in the XML files 224 (see FIG. 4). The report usage repository 214 is also accessed by the in-memory cache population and maintenance engine 228 of the cache management component 208 to govern the maintenance of reports stored in the in-memory cache 222 (see FIG. 5).

Figure 4:
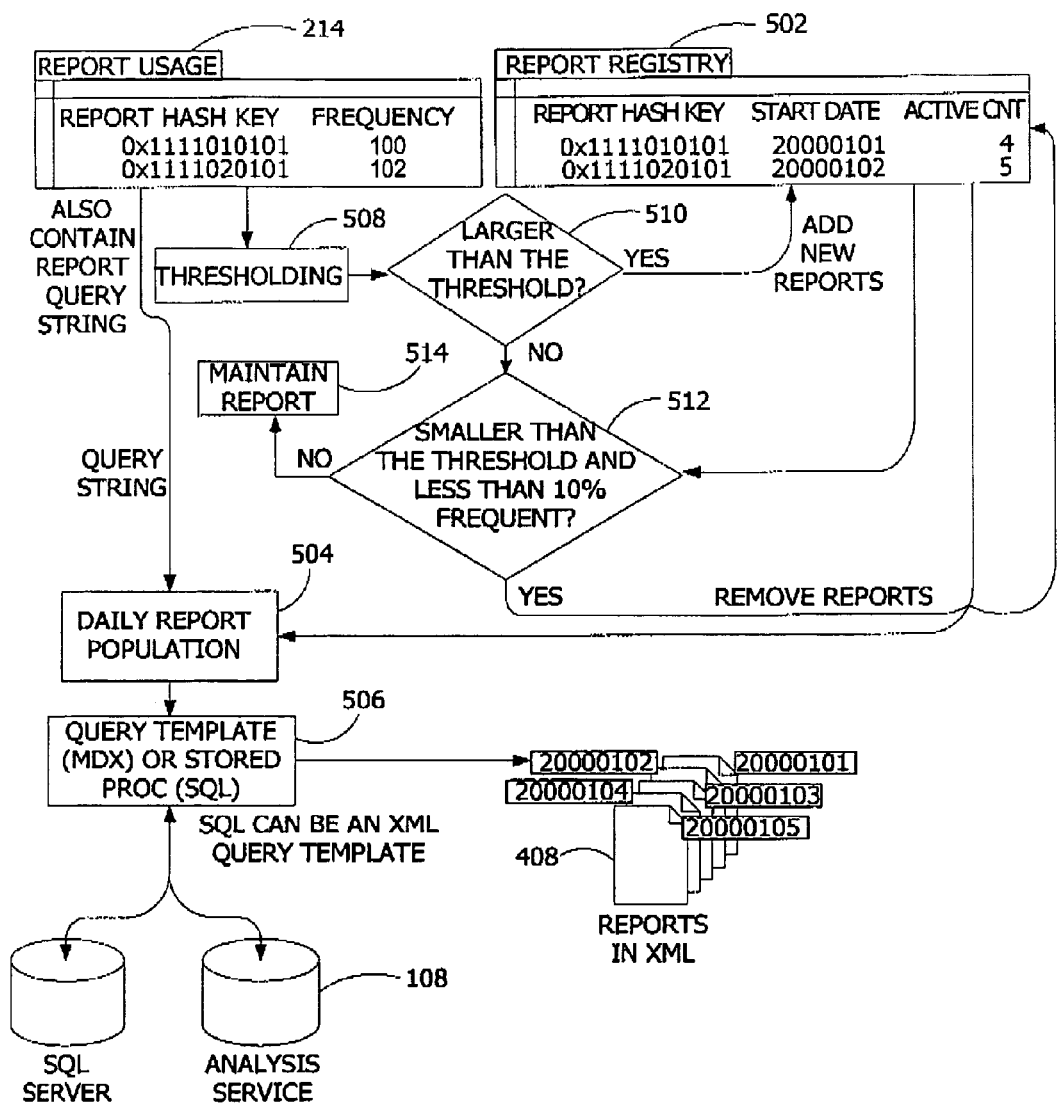
FIG. 4 is a flow chart illustrating exemplary population of reports in a file system.
Figure 5:
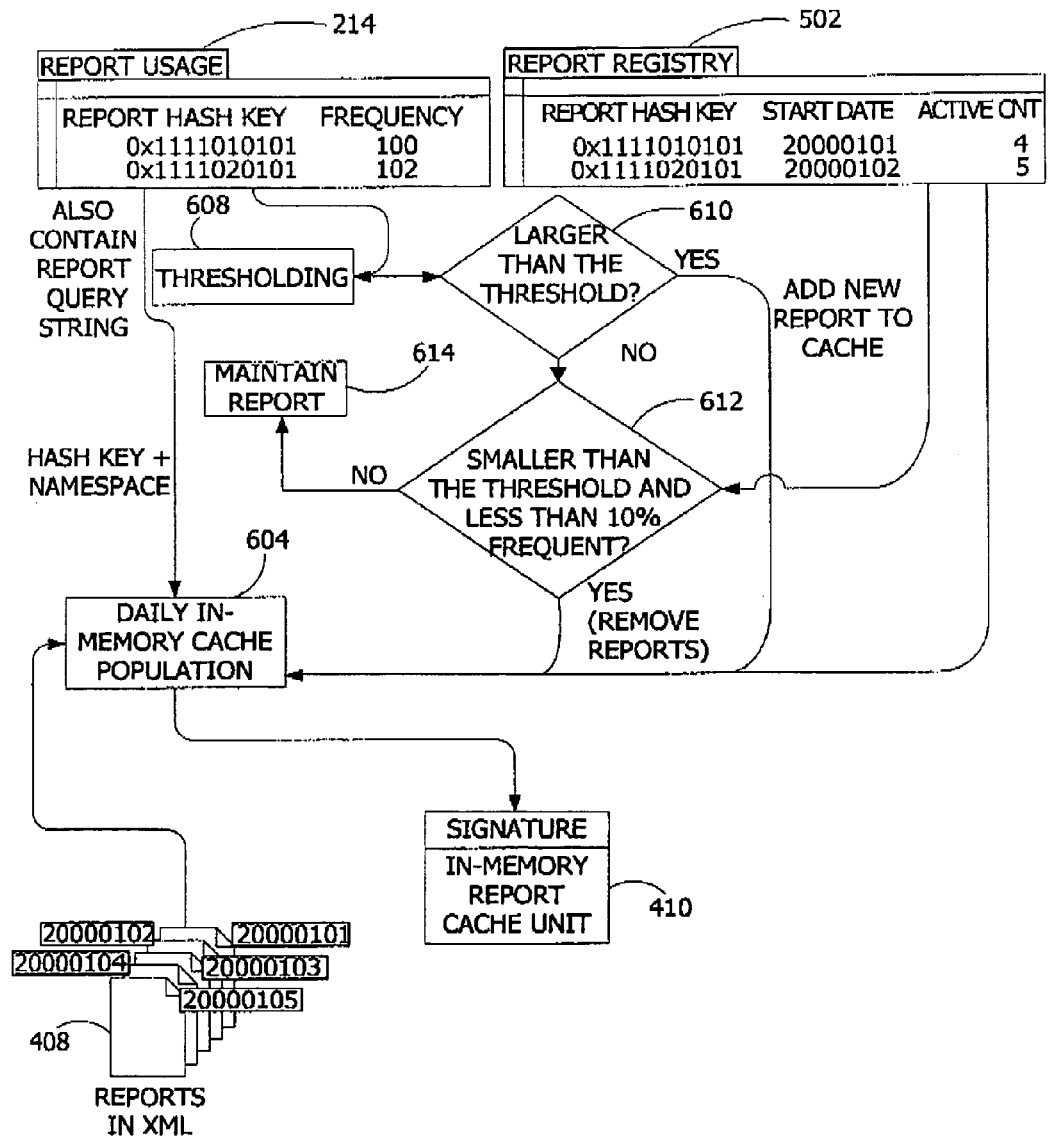
FIG. 5 is a flow chart illustrating exemplary population of reports in memory.

FIG. 4 and FIG. 5 highlight the workflow of an exemplary report management component. In particular, FIG. 4 and FIG. 5 illustrate the population of reports in file systems and memory, respectively.

Update of Reports in XML Files

Referring next to FIG. 4, this section describes operation of the invention software including the sequence of events that occur to populate and maintain at least one report in a repository such as physical XML files. The report population and maintenance component 232 triggers the population and maintenance of the XML reports. For new reports that need to be stored as XML files, data is fetched from the databases such as databases 104, 106 and the XML files are populated. Reports that are no longer needed are deleted. If a report is also cached in memory, then the cache is updated accordingly. Those skilled in the art will note that in some embodiments, not all reports stored in XML files are cached in memory.

The cache scheduler 204 determines a frequency value for a report stored in the report usage repository 214 for comparison with a threshold value. The threshold value is computed dynamically as a function of the available file system memory on the reporting server along with the lifetime frequency of the report being requested and the estimated size of each report. The threshold value governs the decision about whether or not to pre-populate the report or drop the report when the file system memory on the reporting server runs low. Thresholding at 508 ensures that the total size of the cached reports does not exceed the allocated file system cache. The cache scheduler 204 compares the determined frequency value to the threshold value at 510 and adds the report to the report registry 502 if the determined frequency value exceeds the threshold value. When a report's usage has exceeded the threshold value at 510 and there is no extra file system memory to cache the report, a process will be activated to remove cached reports that are less frequently accessed (e.g., the selection criteria are based on the report registry 502). If the determined frequency value for a report is less than the threshold value but the report is also infrequently accessed (e.g., less than 10% frequent) at 512, the report is removed from the file system memory. Otherwise, the report is maintained at 514. In one embodiment, reports in the report usage repository 214 are sorted in the descending order so the most frequently accessed reports will be cached to the file system memory if their addition to the cache does not exceed the available memory.

Popular reports are pre-populated in file systems on a daily basis at 504 according their usage (e.g., as determined by the report usage repository 214 and the report registry 502). Reports 408 are populated from databases such as SQL server 104, 106 or from the analysis service 108 via a query template (e.g., MDX) or stored procedures (e.g., SQL).

Update of Reports Cached in Memory

Referring next to FIG. 5, this section describes the operation of the invention software including the sequence of events that occur to populate and maintain the in-memory cache. FIG. 5 illustrates the case where the reports cached in the file systems will be used directly if they are to be populated in the memory cache. The cache management component 208 triggers the population and maintenance of the in-memory cache reports.

The cache scheduler 204 determines the frequency value for a report stored in the report usage repository 214 for comparison with the threshold value, as discussed with reference to FIG. 4. Thresholding at 608 ensures that the total size of the cached reports does not exceed the allocated in-memory cache. The cache scheduler 204 compares the determined frequency value to the threshold value at 610 and adds the report to the in-memory cache at 604 as an in-memory cache unit 410 if the determined frequency value exceeds the threshold value. When a report's usage has exceeded the threshold value at 610 and there is no extra memory to cache the report, a process will be activated to remove cached reports that are less frequently accessed (e.g., the selection criteria are based on the report registry 502). If the determined frequency value for a report is less than the threshold value but the report is also infrequently accessed (e.g., less than 10% frequent) at 612, the report is removed from the in-memory cache 410 via 604. Otherwise, the report is maintained at 614.

Popular reports are pre-populated in file systems on a daily basis at 604 according their usage (e.g., as determined by the report usage repository 214 and the report registry 502). For new reports that need to be stored in the cache, data is fetched at 604 from XML files 408 if available. If the data is not available in the physical XML files 408, the data is fetched from the databases (see FIG. 4). The XML files are populated with the fetched data and the in-memory cache is populated with the populated XML files. Reports that are no longer needed are deleted. As illustrated in FIG. 5, report population occurs from the XML files, not from the databases. This implies a performance gain as popular reports are pre-populated in file systems on a daily basis at 504 (see FIG. 4) according to their usage. Without any SQL run time query requests, the only time consumed in obtaining a report occurs when loading the XML-based report file into the in-memory cache.

Report Service—Report Dispatch Component

As illustrated in FIG. 2, the report dispatch service, system, or component 210 is a service (e.g., web-based) that takes a report query request from the UI component 302 and returns the report. Exemplary components of an exemplary report dispatch component 210 include, but are not limited to, a query translator 216, a report dispatcher 220, and a security component. The query translator translates a user query into a hash key and a namespace at 216, which are used to access reports stored as XML files at 224 or cached in memory at 222. The hash key corresponds to the RUID and the dimension slices. The namespace corresponds to the time dimension slice. The report dispatch component 210 retrieves reports from the appropriate location (i.e. XML file at 224, memory at 222, or from the database via the data access client proxy) and unions or combines reports together if necessary. When the report cannot be found in the memory and file system, the query is submitted to the original database for data via the data access client proxy. The report dispatch component 210 is also responsible for combining reports together (e.g., if the requested data spans several days). In one embodiment, the final, combined report is in the form of an XML document. A security component performs the task of restricting report access to authorized users (e.g., via an authentication system). Other embodiments implement dimensional level security, role-based security, and cell level security.

Operation of Report Delivery

In operation, an exemplary flow of messages and the interaction between the components of the invention software is next described with reference to FIGS. 1–3. In particular, this section describes the sequence of events that occur when a user submits a request for a report via the UI component 302. The UI component 302 forwards the report request to the report dispatch component 210 of the report component 202. A request includes the name of the report and the values for the dimension. In response to the received query, the report component 202 retrieves the report from a repository via metadata and displays the retrieved report to the user via the UI component 302.

In particular, the report dispatch component 210 receives the report request including report queries and namespaces 212 from the UI component 302. In one embodiment, the report queries and namespaces 212 includes a report unique identifier (RUID), the values for the time dimension slice, the values for the other dimension slices, and the user identifier (ID). The report dispatcher 220 passes the user ID to the security service. The security service verifies whether the user ID is authorized to see the requested report and notifies the report dispatcher 220 about the verification result. If the user is not authorized to see the report, the report dispatcher 220 sends an appropriate message to the UI component 302. If the user is authorized to see the report, the report dispatcher 220 sends a message to the query translator at 216 to get the hash key and namespace for the requested report at 218. Based on the hash key and the namespace at 218, the report dispatcher 220 attempts to obtain the requested report from in-memory cache at 222. If all the data for the requested report is not available in the in-memory cache at 222, the report dispatcher 220 attempts to obtain the requested report from the XML files at 224. If all the data for the requested report is not available in the XML files at 224, the report dispatcher 220 generates the requested report from the databases (not shown) via the report population and maintenance engine 230. The report dispatcher 220 unions or otherwise combines the data and/or reports obtained from various databases into a combined report. The combined report is returned to the UI component 302 in the form of an XML stream using optional security filtration at 226.

File System Structure

Figure 6:
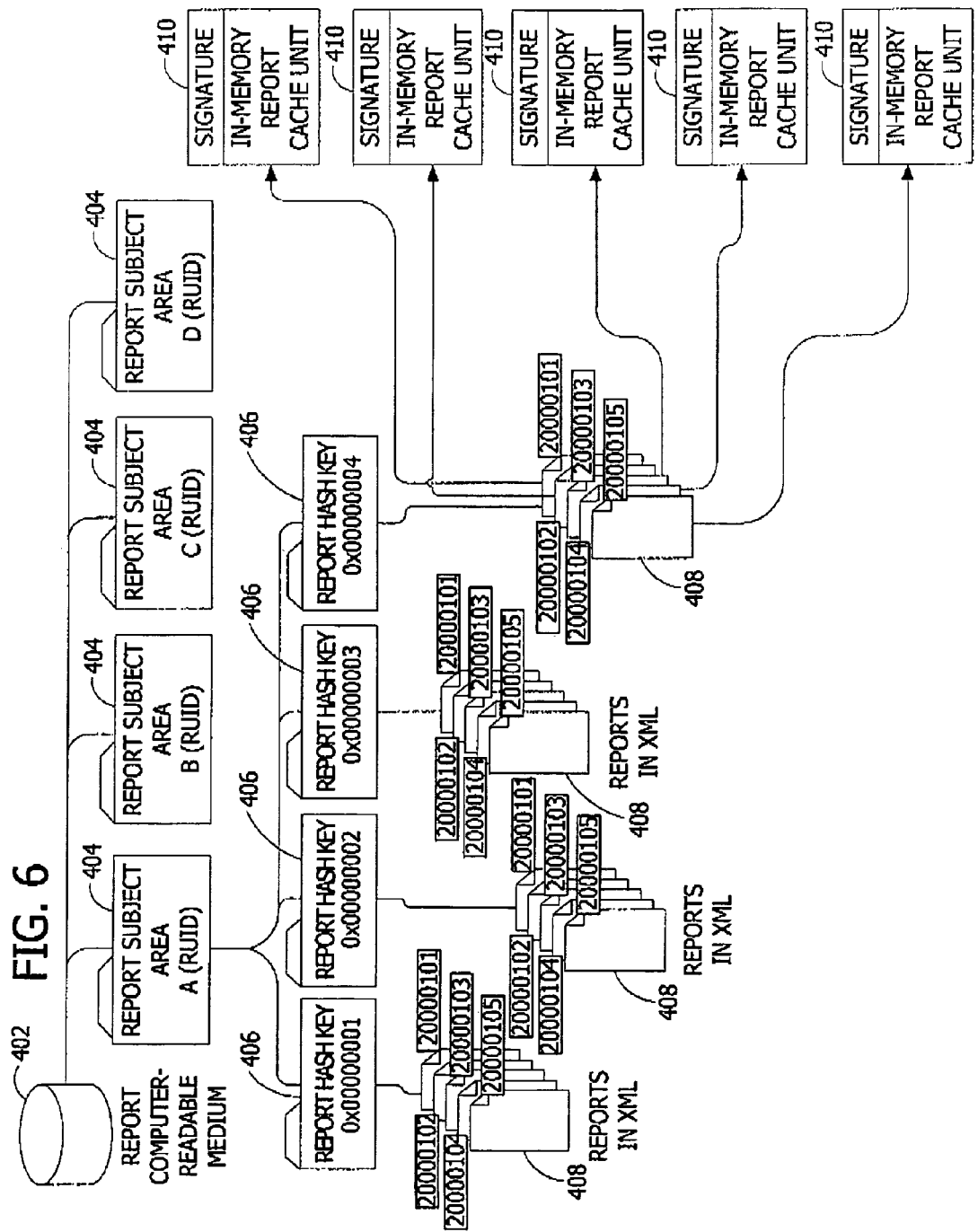
FIG. 6 is a block diagram illustrating an exemplary file system structure for reports.

FIG. 6 depicts an exemplary file system structure for reports. In one embodiment, the file system structure for the reports is maintained by the report component 202, a repository system, or the like. The repository system is responsive to the report dispatch system for populating, maintaining, and delivering the reports for presentation to the user via the user interface component. The reports include data populated from databases via the data access component 102. The file system structure of the repository system (e.g., stored on a report computer-readable medium 402) includes a plurality of report subject areas 404 such as report subject area A, report subject area B, report subject area C, and report subject area D. In one embodiment, the report subject areas 402 are identified by a report unique identifier (RUID). Each of the report subject areas 404 includes a plurality of report hash keys 406 such as report hash key 0x00000001, report hash key 0x00000002, report hash key 0x00000003, and report hash key 0x00000004. Each of the report hash keys 406 identifies a plurality of the reports 408 (e.g., in XML format). For example, report hash key 0x00000001 stores reports 408 such as report #20000101, report #20000102, report #20000103, report #20000104, and report #20000105. Each of the reports 408 refers to an in-memory cache unit 410 having a signature. Each of the report hash keys 406 is unique to the plurality of the reports associated with that report hash key.

For example, each report hash key 406 may be computed using criteria such as a query string of the report 408 excluding the time related information. In one embodiment, the specific algorithm used to hash the criteria is a message digest algorithm such as MD5 so the report hash key 406 uniquely identifies the report 408 if each report 408 is produced by a different query string. Time information such as a date is not included in the report hash key 406 to enable time-based partitioning in the file cache or in memory cache (see FIG. 5 and FIG. 6). The MD5 algorithm takes as input a message of arbitrary length and produces as output a 128-bit message digest or other fingerprint of the input. It is conjectured that it is computationally infeasible to produce two messages having the same message digest, or to produce any message having a given pre-specified target message digest. The MD5 algorithm is employed in digital signature applications, where a large file must be compressed in a secure manner before being encrypted with a private or secret key under a public-key cryptosystem.

When stored in file systems, reports 408 are persisted in the forms of XML files (e.g., XML files). The report subject area 404 is the high level classification of different reports 408 according to the RUID. Under each RUID, the reports 408 are prepared based on the report query (dimension values and metrics). Once a directory for the report hash key 406 is established (i.e., accessed frequently enough to justify pre-population), its content will be pre-populated periodically (e.g., each day) as an XML file. All the reports 408 (in XML) can be requested individually or collectively, depending on the time slice. The report content is maintained in a way that is consistent with the server content. When the server data has been re-stated or corrected, the reports 408 in file systems are re-populated or dropped. Report content includes the report hash key 406 and a namespace ID. The signature of the report 408, if it is cached in memory includes the RUID, report hash key 406, and a time slice. When reports 408 are cached in memory, their signature is used to store and retrieve their content. Each memory data block stores exactly the same report content in one report 408. A report request from a user may include a collection of these memory data blocks.

Metadata Services

The invention implements a consistent data management service driven by metadata to provide managed report population with usage recording functionality. Metadata-driven implementation offers full autonomy for application deployment and management in an operational environment and reduces future development costs. The system of the invention uses the metadata to drive template-based query composition so data service requests are uniform among different service components.

The metadata components include, but are not limited to, data access metadata, user interface metadata, and report metadata. The data access metadata define the structure of the data, and the relationships between the data stored in various physical stores or databases. The data access metadata are implemented in the database to act as the interface for the data access component 102. SQL metadata is an example of data access metadata. The user interface metadata define the structure and properties of the report, including rendering and composition attributes. A report includes a collection of dimension and metrics data. A report query includes a collection of dimension slices and the report subject ID. A report subject area reflects the high level classification of different reports. The report metadata define a workflow of transactions and communications among different service components. The report metadata define how the reports are prepared in the respective databases, (e.g., aggregations of the data or scheduling of the aggregations/joins). The report metadata could also be processes that update a list of reports (e.g., status reports in an online transaction processing system). The data access metadata, user interface metadata, and report metadata of the invention are formatted into an exemplary schema as illustrated in FIG. 7.

Figure 7:
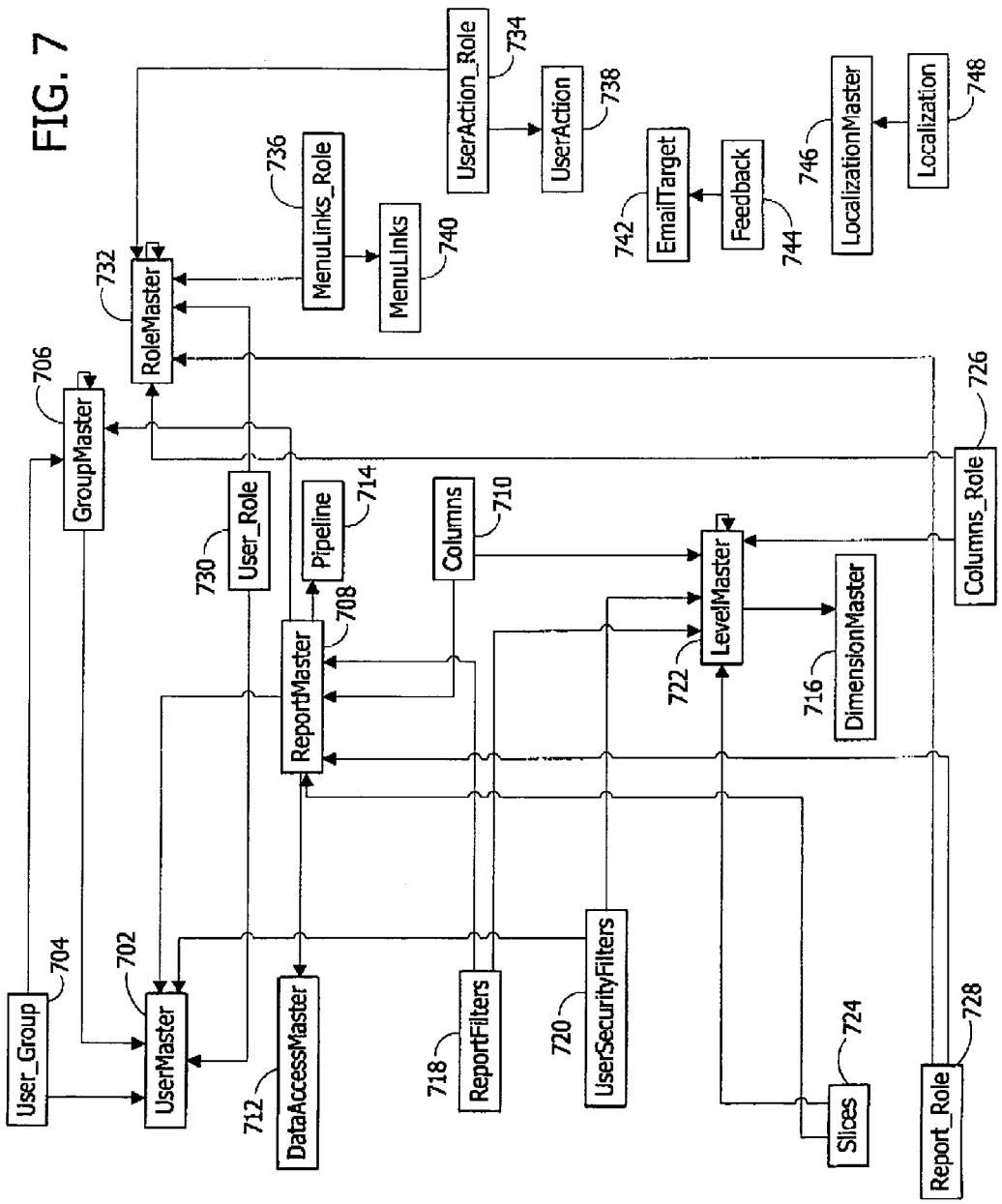
FIG. 7 is a database schema characterizing the physical design of the metadata of the invention.

Those skilled in the art will note that the metadata schema of FIG. 7 and the objects illustrated in FIGS. 8–13 are merely exemplary. It is contemplated by the inventors that other schemas and objects not specifically detailed herein that link the data, reports, and processes to the report service 200 are within the scope of the invention.

FIG. 7 illustrates an exemplary metadata schema for an implementation of the software architecture of the invention. The metadata provides persistent information linking the data, reports, and processes to the report service 200. The exemplary schema in FIG. 7 includes various tables next described. Exemplary contents of each table are shown in Appendix A.

The UserMaster table 702 includes data about all the individual users of the system and their preferences such as the number of rows to display per page, language preference, etc. The User_Group table 704 stores the association between the user and their membership with groups. Reports can be logically grouped to form a report group. Users can then be assigned membership in particular report groups to help the users do their job in a more organized way. The GroupMaster table 706 is a master table that includes data about each logical grouping of reports such as the owners of the reports, type of the grouping, etc. The ReportMaster table 708 is a master table that stores configuration data about all the reports defined in the system, starting and ending dates for which the reports have data available, UI features applicable for each of the reports, and several other parameters that make the report extensible. The Columns table 710 includes all the dimension levels and measures that are defined for each of the report. The Columns table 710 also has configuration information to define which columns are default selected and which columns are available for selection. The DataAccessMaster table 712 includes connectivity information for each of the data stored. The ReportMaster table 708 uses this table to fetch data for each of the reports. The Pipeline table 714 includes valid range of dates that are applicable to each of the reports. Based on the Pipeline table 714 and the start and end dates stored in the ReportMaster table 708, the selection of dates are enabled in the UI. The DimensionMaster table 716 includes all the defined dimensions in the backend data store. The ReportFilters table 718 includes all the columns on which there is a filter defined and their values. These filters are applied before retrieving the data for each of the report to limit the data extraction. The UserSecurityFilters table 720 is used by the UserMaster table 702 to identify what or how much data a user is allowed to see. The UserSecurityFilters table 720 includes the security filters that are applied for each user request to return data that is valid for that user. The LevelMasters table 722 includes all the columns defined under each of the dimensions. The Slices table 724 includes all the slices defined for a report and their values.

Each column defined for a report can have some security context based on its role association. The Columns_Role table 726 stores the role association for each column. In addition, each report can be made visible to all users or a set of users. This can be derived by defining the association of a report with its role. The Report_Role table 728 stores such associations. The User_Role table 730 includes associations between a user and its role. This association defines how much privileges are available to a user inside the system. The RoleMaster table 732 includes roles defined inside the system and their hierarchy. The hierarchy defines the way the security privileges are inherited. The UserAction table 738 includes all the defined actions that can be assigned to a user role. For example, the actions may be "Allowing a user to save a report," "Allowing a user to export a report," etc. The MenuLinks_Role table 736 includes all the defined menu items available in the UI. The UserAction_Role table 734 stores associations between each UserAction and its role. The security of each UserAction is defined by deriving a relationship with the role. The MenuLinks_Role table 736 stores associations between each Menu item and its role. The security of each Menu item is defined by deriving a relationship with the role. The LocalizationMaster table 746 is another master table that includes localization information supported by the system. The LocalizationMaster table 746 includes a locale ID (e.g., LCID) and codepages of each language. In one embodiment, the above tables interact with other tables including a MenuLinks table, an EmailTarget table 742, a Feedback table 744, and a Localization table 748.

Figure 8:
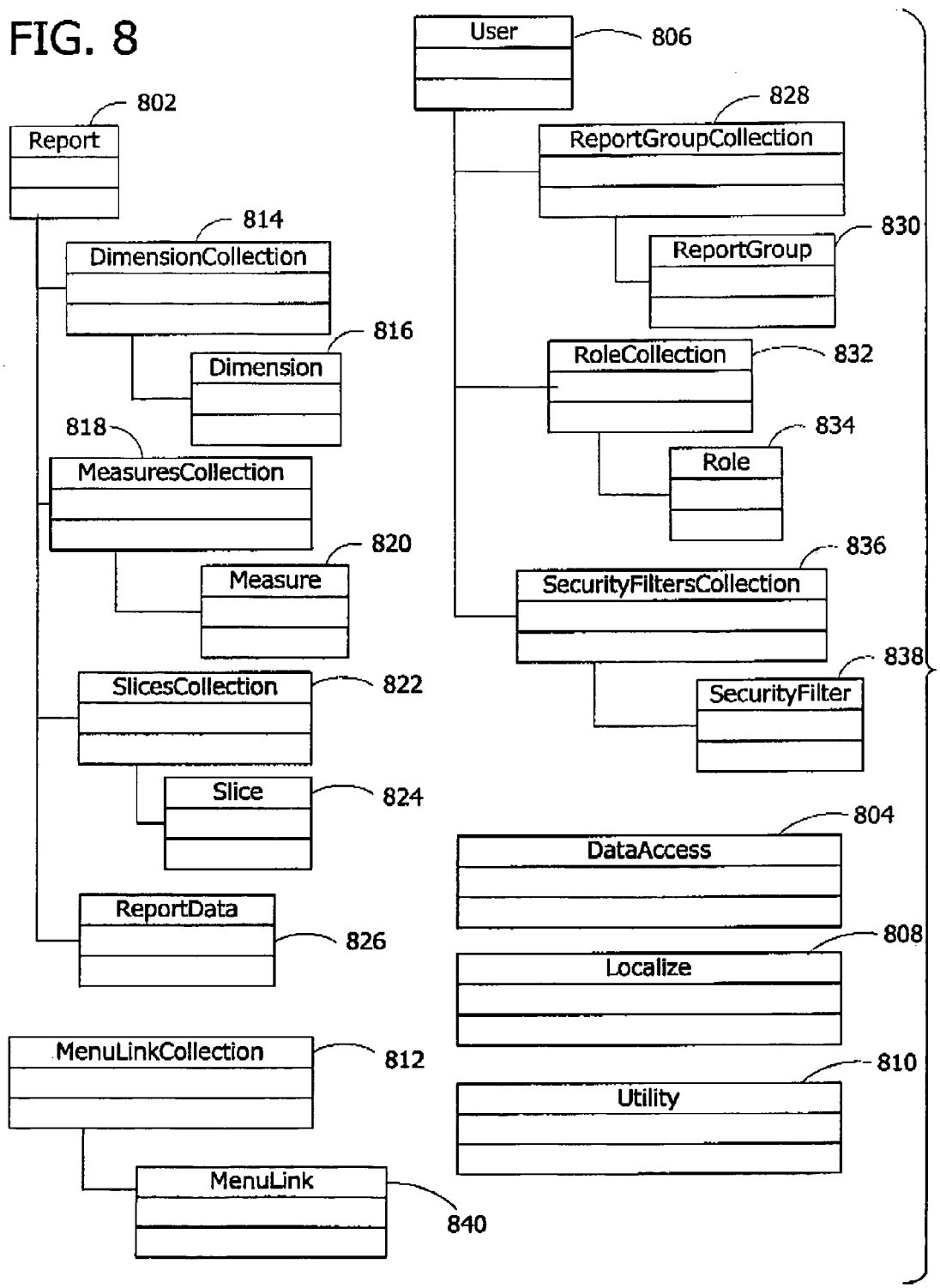
FIG. 8 is a block diagram illustrating an exemplary object model for the reporting service component of the invention.

FIG. 8 illustrates an exemplary object model for components of the report service 200. The objects includes a report object 802, a data access object 804, a user object 806, a localize object 808, a utility object 810, and a menu link collection object 812. The report object 802 has properties including, but not limited to, DimensionCollection 814 storing at least one dimension 816, MeasuresCollection 818 storing at least one measure 820, SlicesCollection 822 storing at least one slice 824, and ReportData 826. The user object has properties including, but not limited to, ReportGroupCollection 828 storing at least one report group 830, RoleCollection 832 storing at least one role 834, and SecurityFiltersCollection 836 storing at least one security filter 838. The menu link collection object 812 stores, for example, at least one menu link 840.

Report Object (Report Metadata)

Referring next to FIG. 9, an exemplary report class represents a report object 802 defining one or more transactions and one or more communications for populating a report with the data from the databases. The report object 802 includes all metadata needed relative to a report definition and the data associated with a report. The report object 802 can be generically called from the UI to load the data and bind it with a grid and also can be loaded by a data population scheduler to preload and cache the metadata. The report object 802 is a multi-dimension object and holds reference to collections for its dimensions, measures and slices and filters. These collections define the columns that constitute the report and the types of measures that are involved. The columns are used to slice the data. The collections specify any additional server-side filters to be applied before retrieving the data. The exemplary report object 802 is illustrated in FIG. 9 according to unified modeling language (UML) conventions. For example, a specific method or property preceded with a "+" sign is a public method or property. Similarly, a specific method or property preceded with a "−" sign is a private method or property.

Properties such as Provider, ServerName, DataBaseName, DBUserName and DBPassword, CubeName define the type of data source the object represents and the connection string parameters needed to establish a connection and retrieve data. Properties such as SortExpression, FilterExpression, LastFilterExpression, and DrillDownExpression define additional filters to be applied after the data is retrieved from the data source. Security properties such as AllowSorting, AllowFiltering and AllowSaving implement any security-specific enabling/disabling on a per-instance basis. The property ReportData holds a reference to the report data in the form of an in-memory database. Methods such as AddNew, Update, and Delete provide ways through which report information can be manipulated. The Execute function can be called by any consumer to load the report data.

Data Access Object (Data Access Metadata)

Referring next to FIG. 10, an exemplary data access class for use by the data access service 100 represents a data access object 804 defining a structure of data within one or more databases. All data access interactions are processed through the data access object 804. The data access object 804 consumes data from a variety of data stores including, but not limited to, a relational database, a multi dimensional data source, and an XML file. Once loaded, the data access object 804 presents the data in an in-memory dataset or a datatable. The data access object 804 also provides generic methods to execute direct SQL commands as well execute parameterized queries using a command object. After retrieval of data, the data access component 102 automatically populates the in-memory cache. Before data retrieval, the data access component 102 checks if the requested data is pre-cached. If found in the cache, the data is served from the cache instead of from the data source. The data access object 804 handles transactions automatically based on attributes set in the called method. The data access component 102 also manages cache objects including loading, unloading, and synchronizing.

User Object (User Interface Metadata)

Referring next to FIG. 11, an exemplary user interface class for use by the UI service 300 includes a user object 806 representing a structure and at least one property of the populated report. In addition, security on the system is implemented by the user object 806 which stores relevant data about a user's role, security filters, and a collection of report groups of which the user is a member. The properties defined in the object describe preferences of the user. The properties include, but are not limited to, NoOfRowsPerPage, DefaultReportId, ColumnExpansion, and LanguageId. The NoOfRowsPerPage property defines how many rows per page the user wants to see in the output report. The DefaultReportId property defines if the users has any default report that needs to be executed as soon as the user logs in. The ColumnExpansion property defines if the user has single level or all level column expansion. Based on the LanguageId property, the user is displayed a localized version of UI and accordingly the number and date formats are globalized based on the locale to which this language belongs.

In addition, the user object 806 holds references to the following external objects for implementing security: role, user security, and report groups. The role object stores information about the current role to which a user is assigned. The user security object includes information about the security filters of a user. The report groups object specifies a collection of report groups that a user is a member of and are visible to the user. Methods in the user object 806 provide functions to clone the user or update or delete the metadata. In addition, this object is used to authenticate the user credentials based on which the user is allowed to access the system.

Application Global Object

Referring next to FIG. 12, an exemplary application global object 1202 for use by the data access service 100, the report service 200, and the UI service 300 is a generic static object that includes a library of functions used from various objects or server-side controls. Static in nature, the application global object 1202 is loaded only once per lifetime of the application. The application global object 1202 also includes a set of global constants that are used in the application for consistency.

Object Model for Server-Side User Controls

Figure 13:
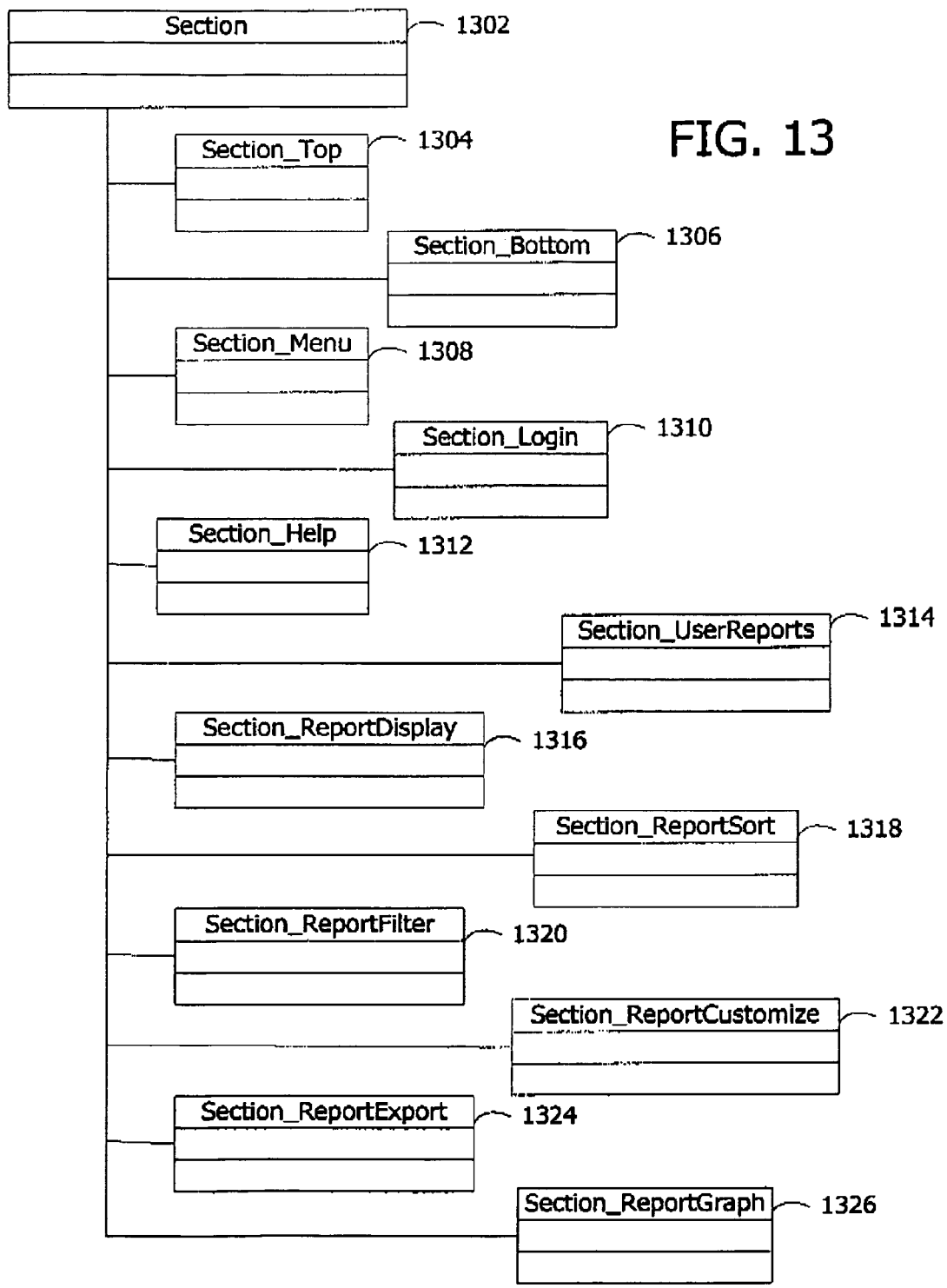
FIG. 13 is a block diagram of an exemplary object model for the user interface component of the invention.
Figure 14:
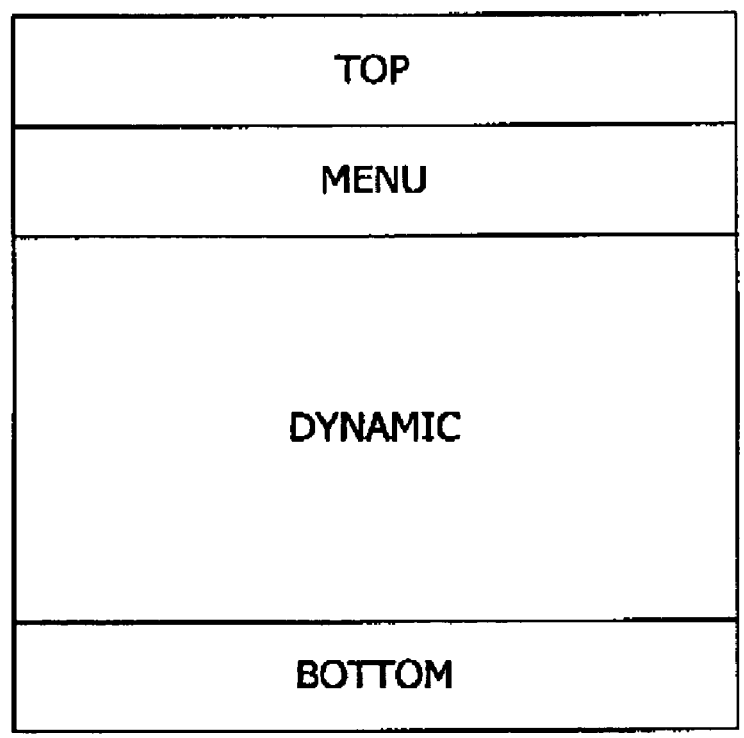
FIG. 14 is a block diagram of an exemplary user interface with divisions.

Referring next to FIG. 13, an exemplary section object 1302 represents server-side UI controls for use by the UI service 300. The UI is divided into 4 sections: a top section, a menu section, a dynamic section, and a bottom section, as illustrated in FIG. 14. Each of these sections loads a specific server side control, each of which is inherited from a base class entitled Section (e.g., section object 1302).

In FIG. 13, the section object 1302 has exemplary properties such as Section_Top 1304 storing static headers and links, Section_Bottom 1306 storing the page footer and other copyright information, and Section_Menu 1308 for drawing the Menu tabs or Menu options that are available to a user based on their security credentials. The top section loads Section_Top 1304, the bottom section loads Section_Bottom 1306, and the menu section loads the Section_Menu 1308. The dynamic section loads different server side controls based on the user actions and request.

When the user needs to select a report for retrieving the data, the dynamic section loads a property such as Section_ReportOpen (not shown) that includes all the available reports for a user and its slices, columns and filters. When a report is run and the data needs to be displayed, the dynamic section loads Section_ReportDisplay 1316. When user management data needs to be displayed, the dynamic section loads a property such as Section_ManageUsers (not shown). Similarly, when report group management data needs to be displayed, the dynamic section loads a property such as Section_ManageGroups (not shown). There can be several similar server side controls that can be developed and hooked into the system to load based on a user action. For example, other exemplary server side controls may load exemplary properties such as Section_Login 1310, Section_Help 1312, Section_UserReports 1314, Section_ReportSort 1318, Section_ReportFilter 1320, Section_ReportCustomize 1322, Section_ReportExport 1324, and Section_ReportGraph 1326.

Security Services

In another embodiment, the software of the invention implements a granular security model to offer security such as for a sophisticated business intelligence application. The data access service 100, the report service 200, and the UI service 300 of the invention software employ security to secure access to data at various levels of granularity. In one embodiment, granular security implementation fulfills the requirements for external reporting of data related to advertising. For example, an external advertiser can only view data pertaining to the advertiser's company.

Figure 15:
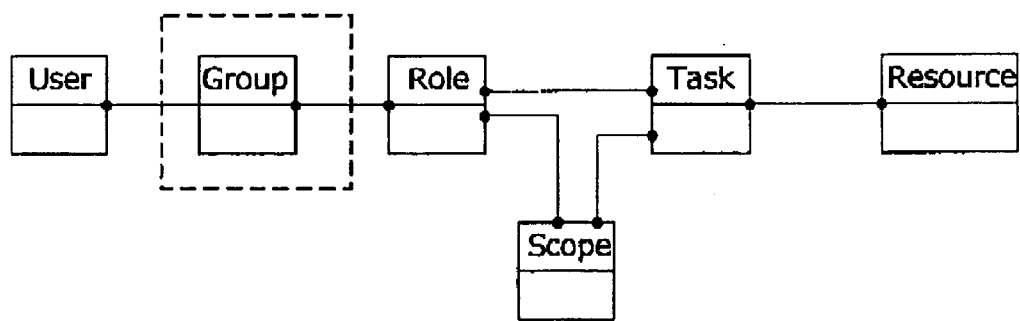
FIG. 15 is a block diagram of an exemplary security model.

The security model is designed to enable the role-based security access on dimensional (column) sensitive reports. In general, a report is composed by a collection of columns and rows. Security filters are applied to columns in an implicit way after the user has been authenticated. Each user object may include a set of attributes related to security filters, deciding the scope of tasks that can be performed with a report or column (i.e., report and column are the resources that a user can consume through a set of actions/tasks). At a conceptual level, users can be organized into a set of groups to access resources. Roles are defined to aggregate resources through a set of tasks with consideration to certain scope. User groups are associated with a collection of roles to enable a manageable resource allocation for each task. In summary, an exemplary security model is illustrated in FIG. 15.

Figure 16:
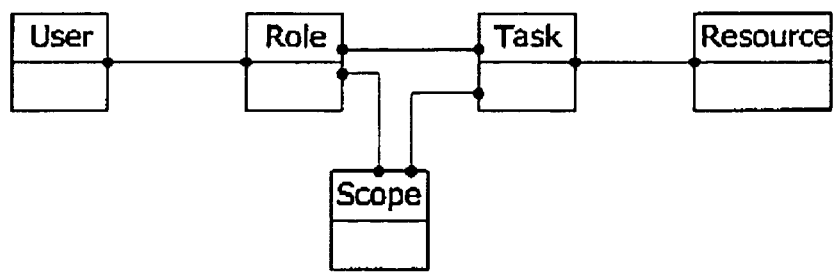
FIG. 16 is a block diagram of an exemplary security schema.

With the concept of "User Group," the user manages the mapping between user and user groups. However, allowing users to create and manage "User Groups" may result in unexpected complexity for the application. As such, in one embodiment, the security model excludes the concept of "User Groups." An exemplary security schema is logically described in FIG. 16.

Some embodiments omit the concept of a "User Group" to simplify the security model (as indicated by the dashed line in FIG. 14). For example, a small company may not have different divisions to differentiate their job functions so "User Role" will be sufficient to dictate how the security can be implemented for the users. Alternatively, if the job function of a manager in a big company is different in each division of the company, a "User Group" concept provide granularity in the security model.

The behavior for implementation of the security model governs what a user can do and see when logging in reporting applications based on the invention software. In the context of the reporting application, exemplary tasks include, but are not limited to, Open, Read, Create, and Assign. Resources in this example cover Reports and Columns (dimensional security). In addition, Users and Roles can be included as part of resources. The exemplary tasks in the reporting application for users may be as follows: create a new user, assign a role to a user, change a password, create a new report group, assign a user to a report group, create a new report, customize an existing report, open a report, filter on an existing column, and read a report.

In one embodiment, a user has a collection of attributes that are used for the security application. The user attributes can include anything associated with a user (these are extensible). The user attributes can be single or set valued attributes. Users manage their own account. Dimensional security is implemented through a set of filters on columns. Roles are pre-defined and organized in a tree structure for association. An override for security filtration on report content is provided to offer the maximum flexibility for security-based content access.

Figure 17:
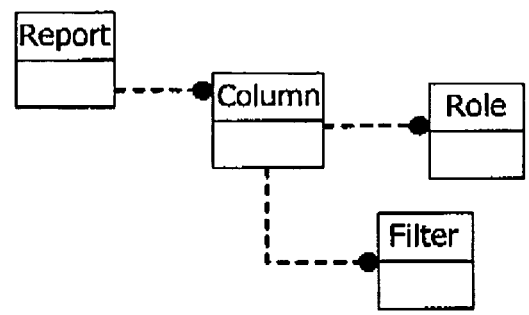
FIG. 17 is a block diagram of an exemplary role-to-task schema.

If role-to-task mappings (e.g., dimensional security implementation) has been defined, other tasks and actions are easier to implement. A report is composed of a collection of columns and row. A column includes a collection of filters and roles to enable the dimensional security filtration on the report content. FIG. 17 depicts an exemplary logical schema for their relationship.

A column will have a SecuritySensitive attribute to indicate if it is to be evaluated by a user's attributes prior to rendering of a report. A security sensitive column has filtration based on certain user attributes. In an exemplary implementation of a reporting application according to the invention, "Advertiser", "Agency", and "AccountExec" are three columns that are defined as security sensitive. This model allows the definition of any column as a security sensitive column to provide a great deal of flexibility for dimensional security. In other embodiments, columns can be enabled, such as a product column, to be security sensitive if a user has appropriate attributes to include in the filter collection for the column.

User attributes include any data known about the user when the user logs in. For example, the following user attributes may be known: Advertiser (i.e., the name of the company), Agency (i.e., the name of the agency), and AccountExec (i.e., the email of the account executive).

If the values for the user attributes cannot be identified, a value such as "None" will be set for the user attributes. For example, if an internal user does not have an attribute for Advertiser/agency, the values for these attributes will be set to "None." The attributes are closely related to filter settings on a security sensitive column. In fact, when enabling a column to be security sensitive, a user has an attribute for the column so a correct filter can be set. Because the security filtration will be applied automatically when a user logs in, its primary function is to provide a dynamic content on standard reports for different kinds of users. To achieve this function, the attributes are set when a user account is created. Unless the attributes are one-to-one with a user or deterministic from our database, the attributes are not correlated together with users. In these cases, a customer administrator provides the information when creating a user. In one embodiment, the customer administrator decides the user's role when creating a user account to simplify the account management process. Otherwise, the customer administrator associates a user with the appropriate set of attributes when an account is created. In one embodiment, the function is not exposed to the UI so customers do not have the flexibility to set other attributes for a user. For example, "adam" is an agency user but does not have an "advertiser" attribute because the customer administrator for this agency is not enabled to set a specific "advertiser" for "adam" when his account is created. In addition, inference on the "advertiser" and "agency" relationship goes through an order table that may introduce unnecessary performance problems and complexity during account creation process. Further, these associations are determined by the customer administrator, which may not be currently derivable by the database and application. However, in other embodiments, the function is exposed to the UI.

The sequence of security filtration applies to columns in the following fashion. A user account is created with a proper role association (the role assignment is based on the security tree of which the creator of the account is part; the creator can only assign roles that are equal or lower than the creator's role in the security tree). A user has a collection of attributes that are related to security sensitive columns. When a standard report is opened by a user, the user attributes are applied to the security sensitive columns as filters. The role a user is associated with decides if filters should be activated when rendering final report. Reports in a report groups override the security filtration dynamically decided by users' attributes. They will always persist the creator's security filtration and his own filter settings. All the other users in the report group will not be able to change the filters set forth by the creator.

Figure 18:
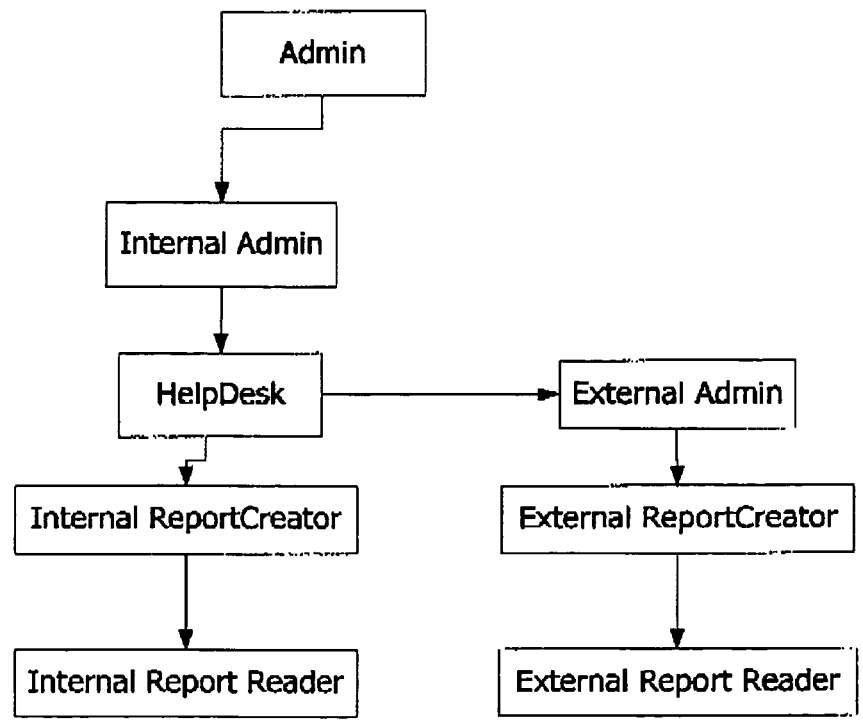
FIG. 18 is a block diagram of an exemplary security tree.

A user will be assigned a role when the account is first created. The user role will then be used to derive the role collection for a user instance. The implementation of driving role collection is based on role's accessibility level against other roles. The roles can be designed in such a way that its relationship is modeled in a tree structure. If a user role is given "create a new user" privilege, it can only assign the roles in its sub-tree or its own role to the new user account it creates. FIG. 18 shows an exemplary security tree. In FIG. 18, a user with "External Admin" role is able to create a user account with the following roles: ExternalAdmin, ExternalReportCreator, and ExternalReportReader. Each user has only one role in the exemplary implementation. However, it implies that it inherits the roles that are in its sub-tree.

When a standard report is opened, the columns with security sensitive attribute set to true are evaluated against the users' attributes to determine how filters should be set for these columns. If the user role is in the column's role collection, the filters determined by the user's attributes are activated for rendering. Otherwise, the column will not be accessible by the user. If the user's corresponding attribute for the column is "None", it means no filter should apply on the column for this user if his/her role activates the filter.

Report groups are created to offer the maximum flexibility of security controls for a group of users. A user that creates a report group will be able to assign other users to use reports in the report group. At the same time, the creator's filters (security or not) will persist on the reports created in the report group. Users other than the creator in the report group cannot change the filters set by the creator; however, they can perform ad-hoc filters during browsing reports. These filters are not persistent, meaning that they cannot be saved. In other words, reports in a report groups do not need to apply dynamic security filtration as they will always persist the creator's filters if any.

All the security sensitive columns have a collection of roles that activate the filters for them. Table 1 lists the column-to-role mapping.

TABLE 1

Column-to-role Mapping

| COLUMN | ROLE |
| --- | --- |
| Agency | ExternalReportReader |
| Advertiser | ExternalAdmin |
| AccountExec | InternalAdmin |

If a column is set to have reportReader role in its role collection, it implies all reportReader's parents will be in the collection as well. We need to check the security tree to infer its relationship.

The following table maps the tasks to the roles.

TABLE 2

Task-to-role Mapping

| TASK | ROLE |
| --- | --- |
| Create a new user | InternalAdmin, ExternalAdmin |
| Assign a role to a user | InternalAdmin, ExternalAdmin |
| Change a password | InternalReportReader, ExternalReportReader |
| Create a new report group | InternalReportCreator, ExternalReportCreator |

TABLE 2-continued

Task-to-role Mapping

| TASK | ROLE |
| --- | --- |
| Assign a user to a report group | InternalReportCreator, ExternalReportCreator |
| Create a new report | InternalReportCreator, ExternalReportCreator |
| Customize an existing report | InternalReportReader, ExternalReportReader |
| Open a report | InternalReportReader, ExternalReportReader |
| Filter on an existing column | InternalReportReader, ExternalReportReader |

If a task is set to have reportReader role in its role collection, it implies all reportReader's parents will have the same level of tasking. The security tree is checked to infer its relationship.

Exemplary Operating Environment

Figure 19:
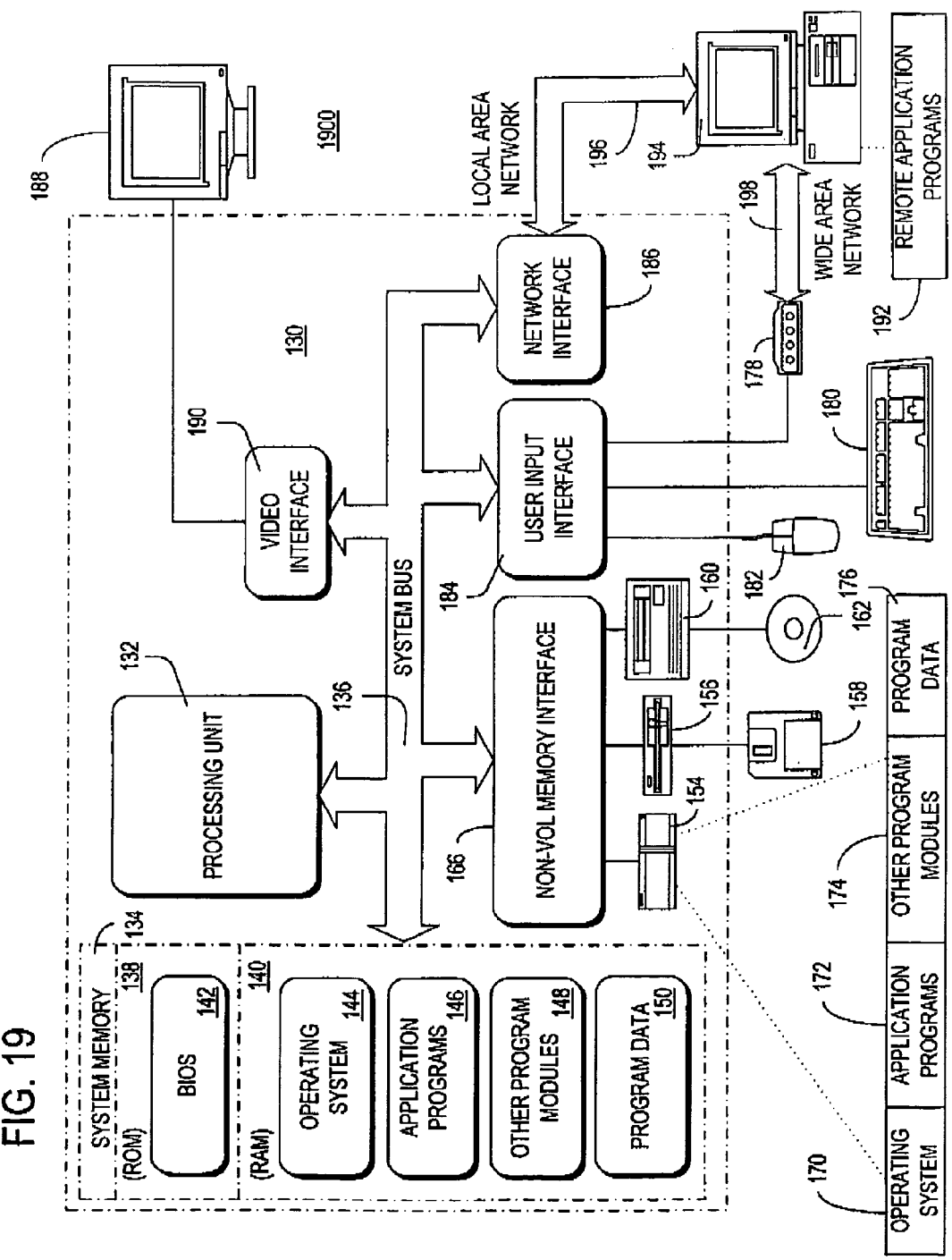
FIG. 19 is a block diagram illustrating one example of a suitable computing system environment in which the invention may be implemented.

FIG. 19 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 19 illustrates operating system 144, application programs 146, other program modules 148, and program data 150.

The computer 130 may also include other removable/non-removable, volatile/nonvolatile computer storage media. For example, FIG. 19 illustrates a hard disk drive 154 that reads from or writes to non-removable, nonvolatile magnetic media. FIG. 19 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 19, provide storage of computer readable instructions, data structures, program modules and other data for the computer 130. In FIG. 19, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 19 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 19 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 1–3 to implement a report service 200 on one or more servers by populating, maintaining, and dispatching reports responsive to user requests for the reports.

EXAMPLES

Figure 20:
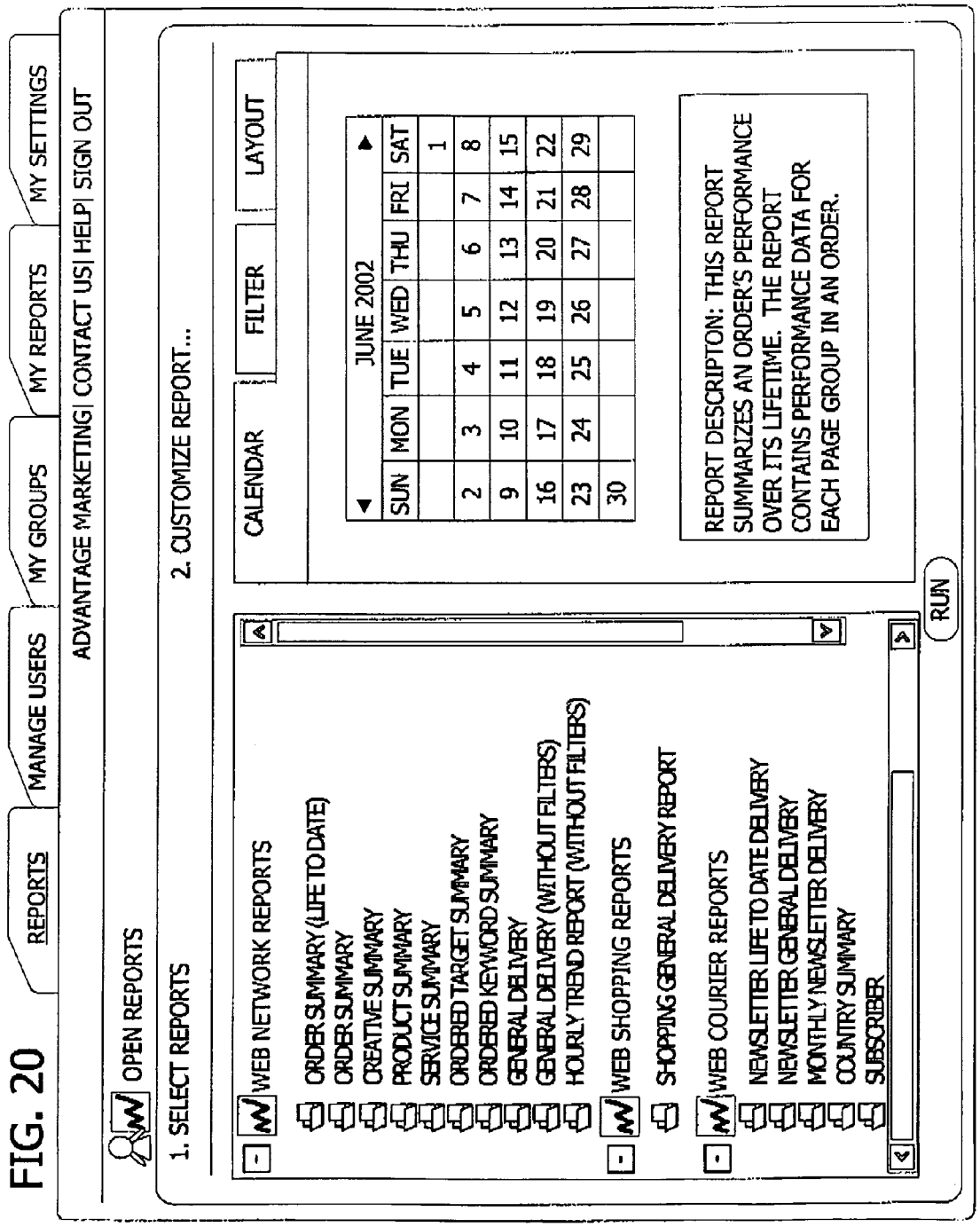
FIG. 20 is a screen shot of the user interface for one exemplary embodiment of the invention illustrating a calendar for selecting a time period for use in generating an order summary report.
Figure 21:
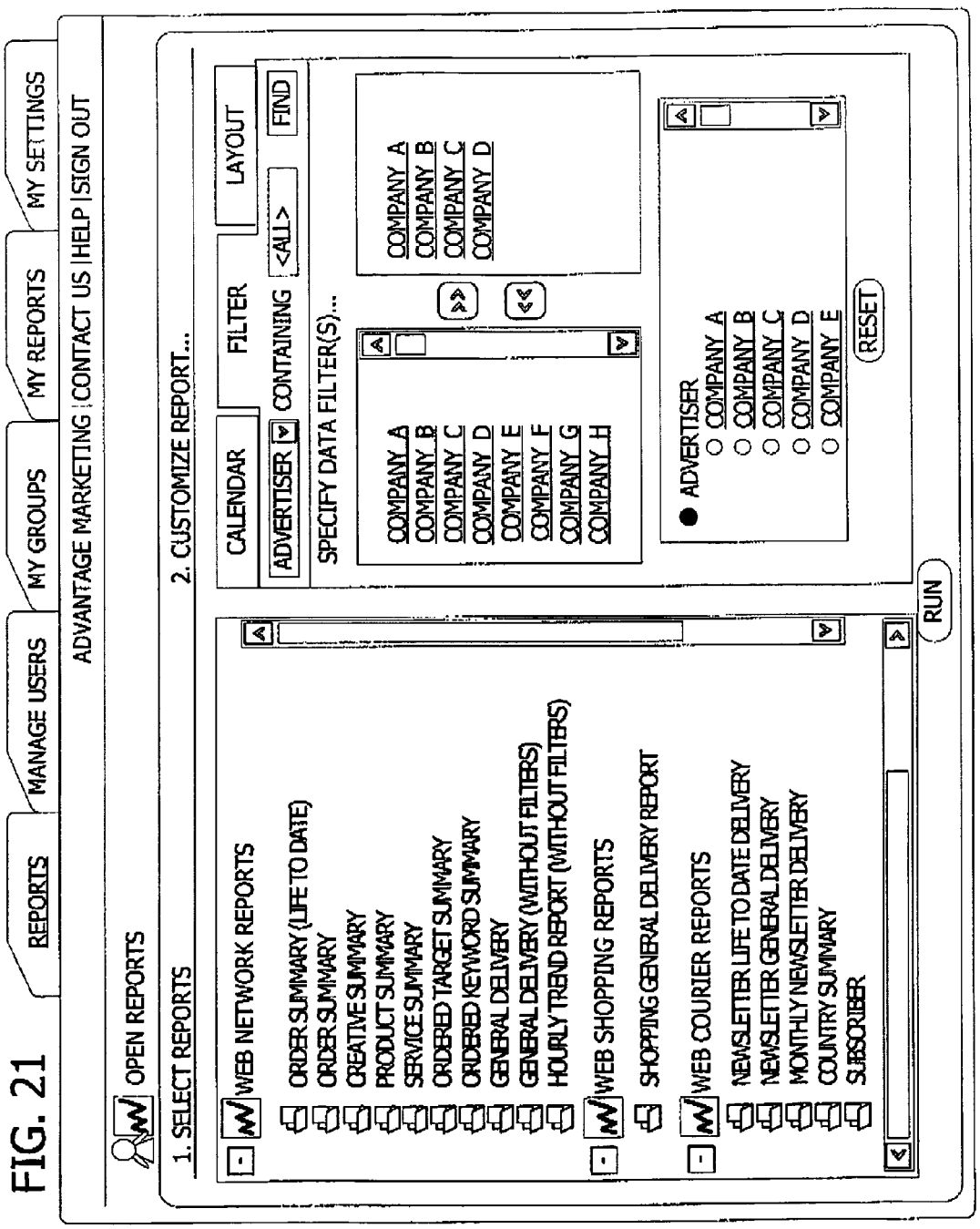
FIG. 21 is a screen shot of the user interface for one exemplary embodiment of the invention illustrating the available and selected data filters for the order summary report.
Figure 22:
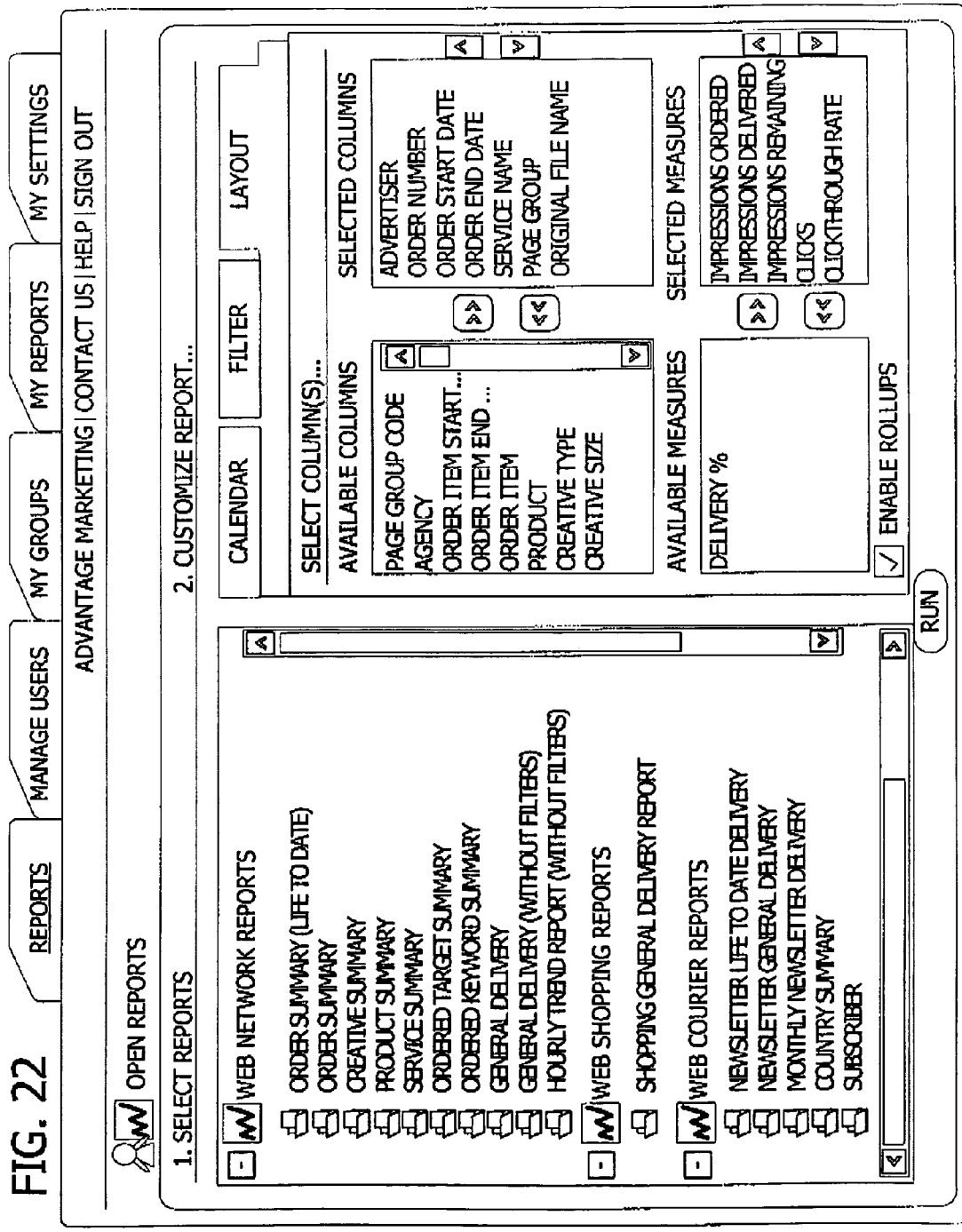
FIG. 22 is a screen shot of the user interface for one exemplary embodiment of the invention illustrating the available and selected columns for displaying the order summary report.
Figure 23:
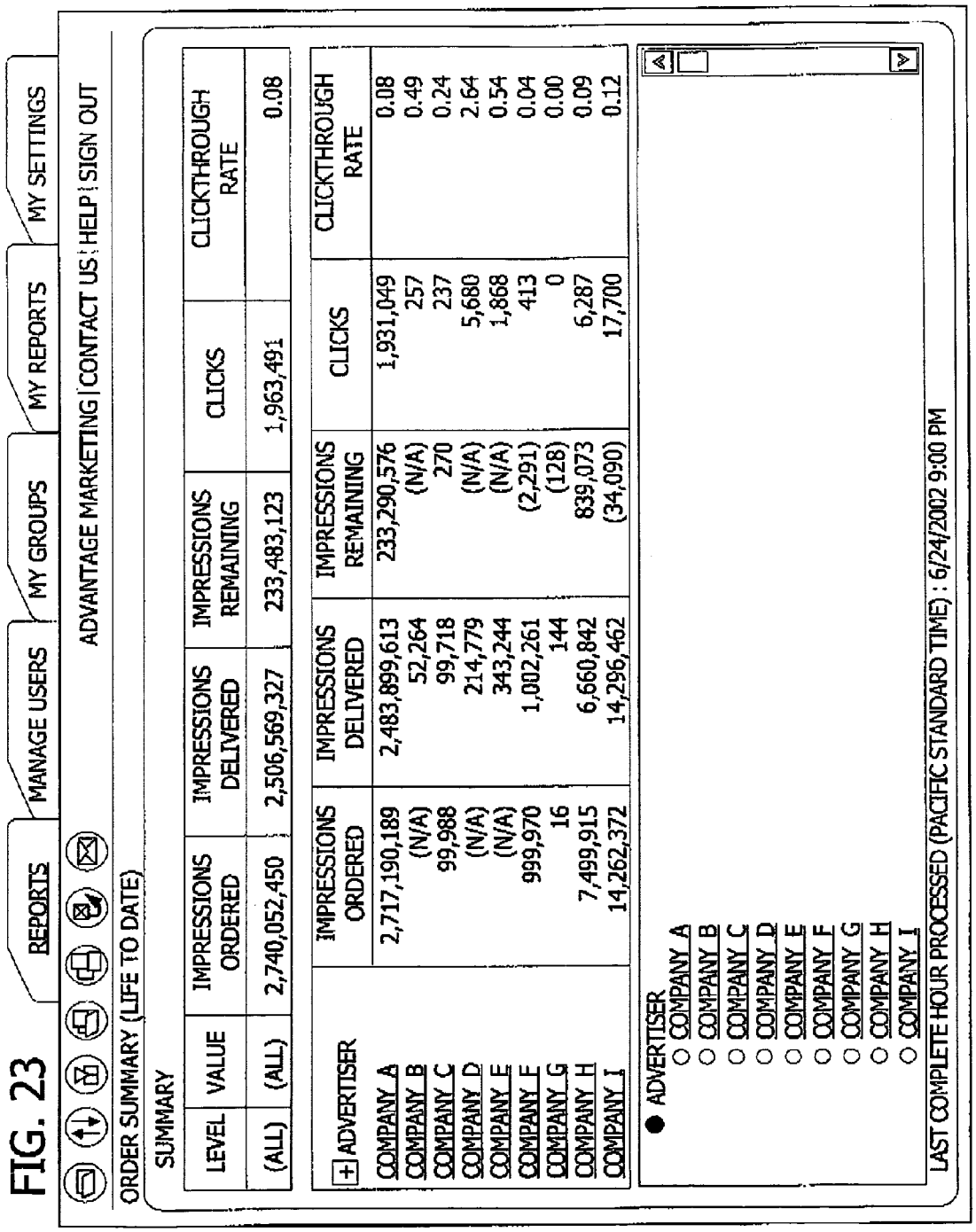
FIG. 23 is a screen shot of the user interface for one exemplary embodiment of the invention illustrating an exemplary order summary report.
Figure 24:
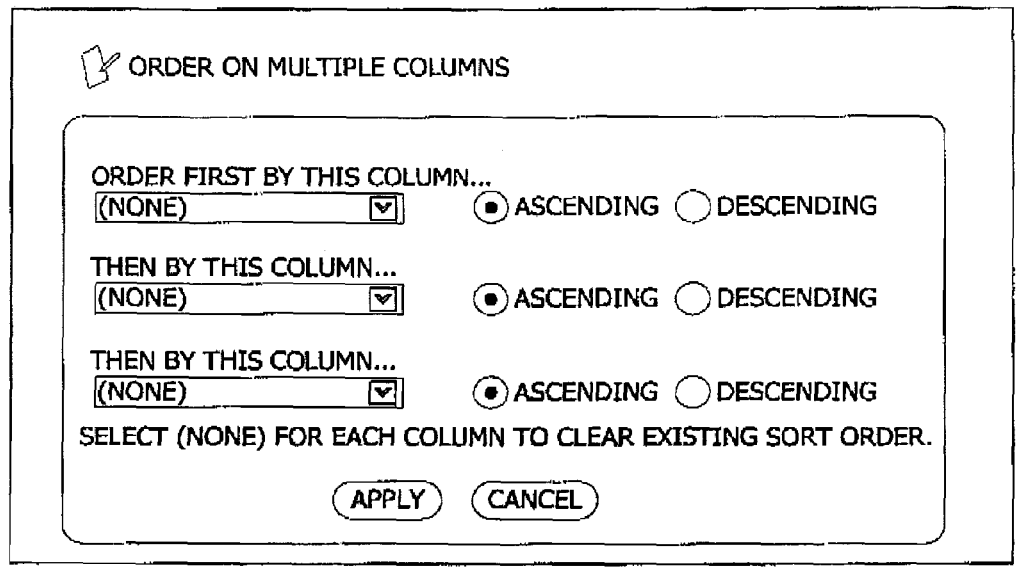
FIG. 24 is a screen shot of the user interface for one exemplary embodiment of the invention illustrating ordering on columns.
Figure 25:
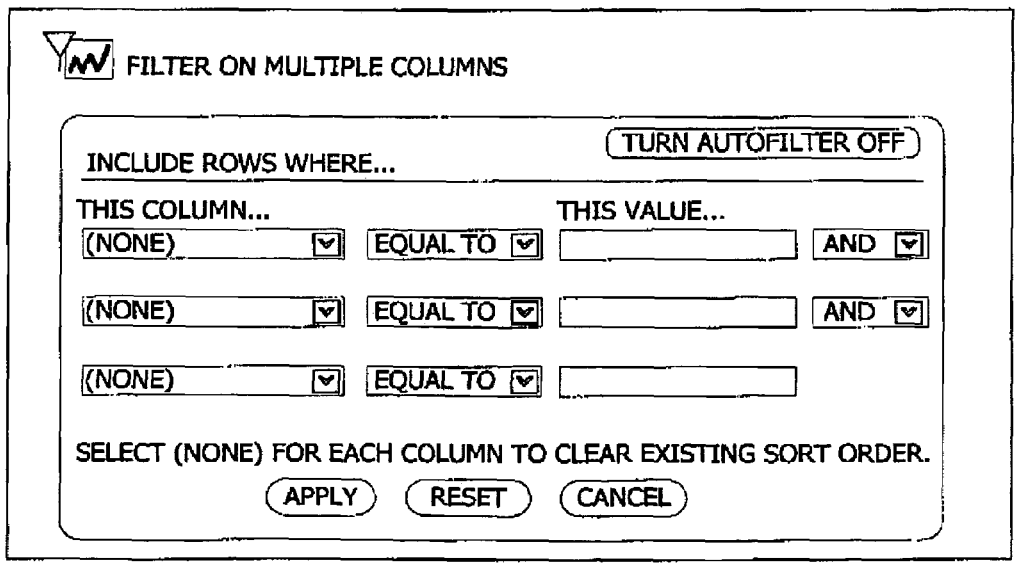
FIG. 25 is a screen shot of the user interface for one exemplary embodiment of the invention illustrating filtering on multiple columns.

The following examples illustrate the invention. FIGS. 20–24 are screen shots of the user interface for one exemplary embodiment of the invention. FIG. 20 displays a calendar for selecting a time period for use in generating an order summary report. FIG. 21 displays the available and selected data filters for the order summary report. FIG. 22 displays the available and selected columns for displaying the order summary report. FIG. 23 displays an exemplary order summary report. FIG. 24 illustrates ordering on columns. FIG. 25 illustrates filtering on multiple columns.

Specifically referring to FIG. 24, in one embodiment, the invention software generates funnel reports. Funnel analysis relates to data mining and automated knowledge extraction. In general, a clickpath funnel report is a study of the clickpath and retention behavior (e.g., a clickthrough rate) among a series of web pages or web sites. Clickpath funnel reports are particularly useful in e-business because they help analyze the usability and structure of a web site. For example, analysts such as business managers, product planners of sites, or anyone interested in retention of users for sign-up or registration processes in their sites use the funnel reports. As a result, analysts can re-negotiate deals with content providers or re-design their sites based on the funnel reports. It is contemplated by the inventors that the invention software is operable with any type of data to produce any type of report. The invention software is not specifically limited to generating funnel reports.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

The following tables list properties of each of the objects in an exemplary schema according to the invention.

| | UserMaster 702 | |
|---|---|---|
| PK | UserId | |
| U1 | UserName | |
| | PUID | |
| U1 | Password | |
| | SecretQuestion | |
| | SecretAnswer | |
| | LanguageID | |
| | IsUserAdmin | |
| | UserEmail | |
| | NoOfRowsPerPage | |
| | IsSuperUser | |
| | DefaultReportId | |
| | CreatedByUserId | |
| | SourceIndicator | |
| | ColumnExpansion | |

| | GroupMaster 706 |
|---|---|
| PK | GroupId |
| | GroupName |
| | GroupDescription |
| FK1 | ParentGroupId |
| | IsStandardGroup |
| | IsPersonalGroup |
| FK2 | OwnerUserId |

| | User_Group 704 |
|---|---|
| PK,FK2 | UserId |
| PK,FK1 | GroupId |

| | Pipeline 714 |
|---|---|
| PK | PipelineId |
| | StartDate |
| | EndDate |
| | StartMonth |
| | EndMonth |
| | PipelineName |
| | FiscalStartDate |
| | FiscalEndDate |
| | FiscalStartMonth |
| | FiscalEndMonth |
| | BroadcastStartDate |
| | BroadcastEndDate |
| | BroadcastStartMonth |
| | BroadcastEndMonth |

| | ReportMaster 708 |
|---|---|
| PK | ReportId |
| | ReportName |
| | ReportDescription |
| | ReportType |
| FK4 | UserId |
| | CreatedOn |
| | LastAccessedOn |
| FK3 | PipelineId |
| | ActiveIndicator |
| | StartDate |
| | EndDate |
| | StartMonth |
| | EndMonth |
| | FiscalStartDate |
| | FiscalEndDate |
| | FiscalStartMonth |
| | FiscalEndMonth |
| | BroadcastStartDate |
| | BroadcastEndDate |
| | BroadcastStartMonth |
| | BroadcastEndMonth |

-continued

| | | |
|---|---|---|
| FK2 | GroupId | |
| FK1 | DataAccessId | |
| | AllowSorting | |
| | AllowFiltering | |
| | AllowSaving | |
| | SortExpression | |
| | FilterExpression | |
| | DrillDownExpression | |
| | CurrentPageNumber | |
| | MaxZoomOutLevel | |
| | IsTemporary | |
| | HasCreative | |
| | HasDetails | |
| | SummaryDetailRelation | |
| | HasTimeSlice | |
| | ReportDataFilter | |
| | FactType | |
| | ShowRollup | |
| | DateRangeSelection | |
| | CacheData | |
| | NeedsSummaryTotal | |
| | CreativeExpression | |

| | DataAccessMaster 712 |
|---|---|
| PK | DataAccessId |
| | ServerName |
| | DatabaseName |
| | Provider |
| | DBUserName |
| | DBPassword |
| | Statement |
| | CubeName |

| | User_Role 730 |
|---|---|
| PK,FK2 | UserId |
| PK,FK1 | RoleId |

| | DimensionMaster 716 |
|---|---|
| PK | DimensionId |
| | DimensionName |

| | LevelMaster 722 |
|---|---|
| PK | LevelId |
| | LevelName |
| FK2 | ParentLevelId |
| | IsMeasure |
| FK1 | DimensionId |
| | DisplayControlId |
| | DataType |
| | IsSecure |
| | DisplayName |
| | AddLookUpHint |

| | UserSecurityFilters 720 |
|---|---|
| PK,FK2 | UserId |
| PK,FK1 | LevelId |
| | FilterValue |

| | ReportFilters 718 |
|---|---|
| PK | FilterId |
| FK2 | ReportId |
| FK1 | LevelId |
| | FilterOrder |

-continued

| | |
|---|---|
| | FilterConfig |
| | FilterValue |
| | FilterText |

Columns_Role 726

| | |
|---|---|
| PK,FK1 | LevelId |
| PK,FK2 | RoleId |

UserAction 738

| | |
|---|---|
| PK | ActionId |
| | DisplayName |
| | Target |

Menu Links 740

| | |
|---|---|
| PK | MenuId |
| | DisplayName |
| | ActiveIndicator |
| | Target |
| | LinkURL |
| | SortOrder |

ReportRole 728

| | |
|---|---|
| PK,FK1 | ReportId |
| PK,FK2 | RoleId |

Slices 724

| | |
|---|---|
| PK | SliceId |
| FK2,U1 | SliceValue |
| FK2,U1 | ReportId |
| FK1,U1 | LevelId |
| | DefaultSlice |
| | SliceType |

Columns 710

| | |
|---|---|
| PK | ColumnId |
| FK2,U1 | ReportId |
| | ActiveIndicator |
| | DisplayOrder |
| | SelectionIndicator |
| FK1,U1 | LevelId |

RoleMaster 732

| | |
|---|---|
| PK | RoleId |
| | DisplayName |
| FK1 | ParentRoleId |

MenuLinks_Role 736

| | |
|---|---|
| PK,FK1 | MenuId |
| PK,FK2 | RoleId |

EmailTarget 742

| | |
|---|---|
| PK | EmailTargetId |
| | DisplayName |
| | EmailAddress |

UserAction_Role 734

| | |
|---|---|
| PK,FK2 | ActionId |
| PK,FK1 | RoleId |

-continued

Feedback 744

| | |
|---|---|
| PK | FeedBackId |
| FK1 | UserName |
| | EmailTargetId |
| | Comments |
| | CompanyName |
| | EmailSent |

LocalizationMaster 746

| | |
|---|---|
| PK | LCID |
| | CodePage |
| | LanguageName |

Localization 748

| | |
|---|---|
| PK | LabelId |
| PK,FK1 | LCID |
| | LabelText |

What is claimed is:

1. A system for reporting implemented on one or more servers, said system comprising:
 a data access component accessing at least one database via data access metadata to provide a logical view of data in the database;
 a report component for populating, maintaining, and dispatching reports via report metadata in response to a report request, said report component having a plurality of report hash keys each identifying a plurality of the reports, said reports being created with data from the database accessed by the data access component, said report component pre-populating the reports in a memory cache based on a frequency at which the reports are accessed and a storage threshold of the report component, wherein the report component is configured to populate reports from the memory cache if the data for the report request is available in the memory cache and wherein the report component is configured to populate reports from the database if the data for the report request is not available in the memory cache; and
 a user interface component for rendering, via user interface metadata, the report dispatched from the report component, wherein a change from the data access component to another data access component results in a code change, and wherein said code change is transparent to the report component and to the user interface component.

2. The system of claim 1, further comprising a database component storing the database.

3. The system of claim 1, wherein the user interface component and the report component communicate via a web service.

4. The system of claim 3, wherein the web service is based on a simple object access protocol (SOAP).

5. The system of claim 1, wherein the data access component and the report component communicate via a web service.

6. The system of claim 1, wherein the report component comprises:
 a cache scheduler for populating and maintaining the reports; and a virtual data layer having a cache management component for managing the reports stored in a cache, and a dispatch component for dispatching the reports to the user interface component.

7. The system of claim 6, wherein the cache scheduler comprises one or more of the following: a report usage repository, a file store, a file registry, and an in-memory cache.

8. The system of claim 6, wherein the dispatch component comprises a query translator, a report dispatcher, or both.

9. The system of claim 1, wherein the data access component comprises one or more of the following: a structured query language reporting driver, an online analytical processing web service, an extensible markup language web service, and a data access client proxy.

10. The system of claim 1, wherein the user interface component comprises one or more of the following: a data grid, a custom display, a calendar control, a tree-view control, and a composite control.

11. The system of claim 1, wherein the data access metadata define the structure of the data and the relationships among the data stored in the database.

12. The system of claim 1, wherein the report metadata defines one or more transactions and one or more communications for populating the reports with the data from the database.

13. The system of claim 1, wherein the user interface metadata define the structure and at least one property of the reports.

14. The system of claim 13, wherein the property of the reports comprises a rendering attribute.

15. The system of claim 13, wherein the property of the reports comprises a composition attribute.

16. The system of claim 1, wherein the report component loads the data access metadata, the report metadata, and the user interface metadata into memory.

17. The system of claim 1, wherein the user interface component, the report component, and the data access component are coupled to and communicate via a data communication system.

18. The system of claim 1, wherein the user interface component, the report component, and the data access component execute on a single server.

19. One or more computer-readable media comprising a metadata schema in a reporting information service system, the metadata schema comprising:
at least one data access class representing a data access object defining a structure of data within one or more databases;
at least one report class representing a report object defining one or more transactions and one or more communications for populating reports in response to a report request with the data from the databases, said report object pre-populating one or more reports in a memory cache corresponding to each of a plurality of report hash keys based on a frequency at which the reports are accessed and a threshold value of the at least one report class, each of the report hash keys identifying a plurality of the reports, wherein the report object is configured to populate reports from the memory cache if the data for the report request is available in the memory cache and wherein the report object is configured to populate reports from the one or more database if the data for the report request is not available in the memory cache; and
at least one user interface class representing a structure and at least one property of the populated reports.

20. The computer-readable media of claim 19, said report object comprising metadata relative to a report definition and the data associated with the reports.

21. The computer-readable media of claim 19, wherein said report object is a multi-dimension object, said report object referencing one or more collections defining columns and measures that constitute the reports, columns for slicing the reports, and/or filters to apply before retrieving data from the databases.

22. The computer-readable media of claim 19, said report class comprising a property defining the databases and defining at least one connection string parameter to establish a connection with the defined databases and retrieve the data.

23. The computer-readable media of claim 22, said report class comprising a property defining additional filtration to be applied after the data is retrieved from the databases.

24. The computer-readable media of claim 19, said report class comprising at least one method for manipulating the reports.

25. The computer-readable media of claim 19, said user interface class comprising a property defining one or more preferences of a user.

26. The computer-readable media of claim 25, said property defining one or more of the following: number of rows per page to display, a default report to display, column expansion options, and language specification.

27. The computer-readable media of claim 19, said data access object defining a multidimensional database.

28. The computer-readable media of claim 19, said data access object defining an extensible markup language file.

29. The computer-readable media of claim 19, said data access class comprising at least one method for executing structured query language commands and/or executing parameterized queries.

30. A method for use in a reporting delivery service system, said method comprising:
receiving a query from a user representing a request for a report from a plurality of reports, each of the plurality of reports having one or more time-based dimension slices associated therewith, said one or more time-based dimension slices being partitioned according to a time period for identifying each of the plurality of reports;
translating the received query into a report hash key and a namespace, said namespace including a value representative of the one or more time-based dimensions slices for the requested report, each of the report hash keys being associated with a plurality of reports;
identifying the requested report from the plurality of reports based on the report hash key and the namespace, including the one or more time-based dimension slices, associated with the requested report; and
in response to the received query, retrieving the identified report from a repository via metadata and displaying the retrieved report to the user.

31. The method of claim 30, wherein said retrieving comprises retrieving the report from one or more of the following: a database, a cache, and a file system.

32. The method of claim 30, wherein said metadata comprise data access metadata defining a structure of data within the repository.

33. The method of claim 30, wherein said metadata comprise report metadata defining one or more transactions and one or more communications for populating the report with the data from the repository.

34. The method of claim 30, wherein said retrieving comprises retrieving the report from the repository based on the report hash key and the namespace.

35. The method of claim 30, said retrieving comprises retrieving data from the repository to generate the report.

36. The method of claim 30, wherein the query represents a request for a plurality of reports as a function of the one or more time-based dimension slices and said retrieving comprises retrieving each of the requested plurality of reports, and further comprising combining the retrieved reports into a combined report, and said displaying comprises displaying the combined report to the user.

37. The method of claim 30, wherein the query comprises a name of the report and a value for at least one dimension.

38. The method of claim 30, further comprising receiving a value for at least one dimension slice and receiving a user identifier from the user.

39. The method of claim 30, wherein one or more computer-readable media have computer-executable instructions for performing the method of claim 30.

40. A method for populating and maintaining at least one report in a repository, said method comprising;
  receiving a request from a user for a report;
  translating the received request into a report hash key and a namespace, said namespace including a value for one or more time-based dimensions slices for the requested report, each of the report hash keys being associated with a plurality of reports, said one or more time-based dimension slices being partioned according to a time period for identifying each of the plurality of reports;
  in response to the received request, generating the requested report from the plurality of reports based on the report hash key and the namespace, including the one or more time-based dimension slices, associated with the requested report and displaying the generated report to the user, said generated report being associated with the time period represented by the one or more time-based dimensions slice;
  computing a frequency value for the requested report;
  comparing the computed frequency value to a threshold value;
  adding the requested report to a repository if the computed frequency value exceeds the threshold value; and
  associating the added report with one of a plurality of report hash keys, wherein each of the plurality of report hash keys identifies a plurality of reports, and wherein the added report is identifiable by the associated report hash key and the associated one or more time-based dimension slices.

41. The method of claim 40, said computing comprising computing a frequency value for the requested report based on one or more of the following: a frequency of access for the requested report, a measure when the source data for the request has been changed, and a measure when updates occur at a fixed time period.

42. The method of claim 40, said computing comprising computing a frequency value for the requested report based on a size of memory available in the repository.

43. The method of claim 40, further comprising removing a requested report from the data store if the threshold value exceeds the frequency value.

44. The method of claim 40, wherein said computing comprises computing a frequency value for the requested report stored in one or more of the following: a database, a cache, and a file system.

45. The method of claim 40, wherein one or more computer-readable media have computer-executable instructions for performing the method of claim 40.

46. The system of claim 1, wherein each of the reports has one or more time-based dimensions slices associated therewith, said one or more time-based dimension slices being partitioned according to a time period for identifying each of the plurality of reports and wherein a structure of each of the plurality of report hash keys excludes the one or more time-based dimension slices.

* * * * *